(12) United States Patent
Balasubramanian et al.

(10) Patent No.: US 12,167,234 B2
(45) Date of Patent: Dec. 10, 2024

(54) ENCRYPTION KEY GENERATION AND VERIFICATION TECHNIQUES

(71) Applicant: QUALCOMM Incorporated, San Diego, CA (US)

(72) Inventors: Anantharaman Balasubramanian, San Diego, CA (US); Junyi Li, Fairless Hills, PA (US); Hong Cheng, Basking Ridge, NJ (US); Shuanshuan Wu, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 371 days.

(21) Appl. No.: 17/665,203

(22) Filed: Feb. 4, 2022

(65) Prior Publication Data
US 2023/0254689 A1 Aug. 10, 2023

(51) Int. Cl.
*H04W 12/041* (2021.01)
*H04L 9/32* (2006.01)
*H04W 12/03* (2021.01)
*H04W 24/10* (2009.01)

(52) U.S. Cl.
CPC ......... *H04W 12/041* (2021.01); *H04L 9/3247* (2013.01); *H04W 12/03* (2021.01); *H04W 24/10* (2013.01)

(58) Field of Classification Search
CPC ... H04L 9/3247; H04L 9/0861; H04L 9/0869; H04L 9/0875; H04W 12/03; H04W 12/041; H04W 12/65; H04W 12/60
See application file for complete search history.

(56) References Cited

U.S. PATENT DOCUMENTS

2021/0092592 A1  3/2021  Yunusov et al.
2021/0092593 A1* 3/2021  Yunusov ............... H04B 7/063

OTHER PUBLICATIONS

International Search Report and Written Opinion—PCT/US2023/060421—ISA/EPO—Apr. 21, 2023.

* cited by examiner

*Primary Examiner* — Olugbenga O Idowu
(74) *Attorney, Agent, or Firm* — QUALCOMM Incorporated

(57) ABSTRACT

Methods, systems, and devices for wireless communications are described. A first user equipment (UE) may generate a first encryption key and a second UE may generate a second encryption key based on a measurement of a channel between the first UE and the second UE. The second UE may transmit, to the first UE, a sidelink message including a one-way digital signature generated using the second encryption key and a message from a defined set of messages. The first UE may generate a set of one-digital signatures using the first encryption key and the defined set of messages and determine whether the one-way digital signature matches one of the set of one-way digital signatures. If there is a match, the first UE and the second UE may communicate using the encryption keys. Otherwise, the first UE and the second UE may generate new encryption keys.

30 Claims, 18 Drawing Sheets

ENCRYPTION KEY GENERATION AND VERIFICATION TECHNIQUES

FIELD OF TECHNOLOGY

The following relates to wireless communications, including encryption key generation and verification techniques.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, communication devices may secure transmissions over a channel using an encryption key to encrypt and decrypt messages. In some cases, however, an eavesdropping device may determine the encryption key and may thus be able to intercept and decrypt the messages communicated over the channel. Thus, techniques for improving encryption key generation may be desired.

SUMMARY

The described techniques relate to improved methods, systems, devices, and apparatuses that support encryption key generation and verification techniques. Generally, the described techniques support the independent generation of encryption keys by sidelink devices (e.g., user equipment (UE) communicating over a sidelink channel) and verification of whether the independently generated encryption keys are the same. For example, based on a measurement of a channel between a first UE and a second UE, the first UE may generate a first encryption key, and the second UE may generate a second encryption key (e.g., independently from the first UE). The second UE may generate a first one-way digital signature based on the second encryption key and a first message from a defined set of messages. For example, the second UE may input the second encryption key and the first message into a one-way mapping function that outputs the first one-way digital signature.

The second UE may transmit a sidelink message to the first UE that includes the first one-way digital signature to enable verification of whether the first encryption key is the same as the second encryption key. For example, the first UE may generate a set of one-way digital signatures using the first encryption key and the defined set of messages including the first message. The first UE may compare the first one-way digital signature to the set of one-way digital signatures to determine whether the first one-way digital signature matches one of the set of one-way digital signatures. If there is a match, the first UE may determine that the first encryption key and the second encryption key are the same and may communicate sidelink signaling with the second UE using the first encryption key. Alternatively, if there is a lack of a match, the first UE may determine that the first encryption key and the second encryption key are different. Here, the first UE and the second UE may independently generate new encryption keys and new one-way digital signature(s) for verifying whether the new encryption keys are the same.

A method for wireless communication at a first UE is described. The method may include generating a first encryption key at the first UE based on a measurement of a channel between the first UE and a second UE, receiving, from the second UE, a sidelink message including a first one-way digital signature, where the first one-way digital signature is based on a first message from a defined set of messages and a second encryption key at the second UE, generating a set of one-way digital signatures at the first UE using the first encryption key, where each one-way digital signature of the set of one-way digital signatures corresponds to a separate message of the defined set of messages, and selecting between using the first encryption key to communicate with the second UE and generating a new encryption key to communicate with the second UE, where the selecting is based on a comparison between the first one-way digital signature received from the second UE and a second one-way digital signature in the set of one-way digital signatures generated at the first UE.

An apparatus for wireless communication at a first UE is described. The apparatus may include a processor, memory coupled with the processor, and instructions stored in the memory. The instructions may be executable by the processor to cause the apparatus to generate a first encryption key at the first UE based on a measurement of a channel between the first UE and a second UE, receive, from the second UE, a sidelink message including a first one-way digital signature, where the first one-way digital signature is based on a first message from a defined set of messages and a second encryption key at the second UE, generate a set of one-way digital signatures at the first UE using the first encryption key, where each one-way digital signature of the set of one-way digital signatures corresponds to a separate message of the defined set of messages, and select between using the first encryption key to communicate with the second UE and generating a new encryption key to communicate with the second UE, where the selecting is based on a comparison between the first one-way digital signature received from the second UE and a second one-way digital signature in the set of one-way digital signatures generated at the first UE.

Another apparatus for wireless communication at a first UE is described. The apparatus may include means for generating a first encryption key at the first UE based on a measurement of a channel between the first UE and a second UE, means for receiving, from the second UE, a sidelink message including a first one-way digital signature, where the first one-way digital signature is based on a first message from a defined set of messages and a second encryption key at the second UE, means for generating a set of one-way digital signatures at the first UE using the first encryption key, where each one-way digital signature of the set of one-way digital signatures corresponds to a separate message of the defined set of messages, and means for selecting between using the first encryption key to communicate with the second UE and generating a new encryption key to communicate with the second UE, where the selecting is based on a comparison between the first one-way digital signature received from the second UE and a second one-way digital signature in the set of one-way digital signatures generated at the first UE.

A non-transitory computer-readable medium storing code for wireless communication at a first UE is described. The code may include instructions executable by a processor to generate a first encryption key at the first UE based on a measurement of a channel between the first UE and a second UE, receive, from the second UE, a sidelink message including a first one-way digital signature, where the first one-way digital signature is based on a first message from a defined set of messages and a second encryption key at the second UE, generate a set of one-way digital signatures at the first UE using the first encryption key, where each one-way digital signature of the set of one-way digital signatures corresponds to a separate message of the defined set of messages, and select between using the first encryption key to communicate with the second UE and generating a new encryption key to communicate with the second UE, where the selecting is based on a comparison between the first one-way digital signature received from the second UE and a second one-way digital signature in the set of one-way digital signatures generated at the first UE.

Some examples of the method, apparatuses, and non-transitory computer-readable medium described herein may further include operations, features, means, or instructions for communicating, with the second UE, a second sidelink message using the first encryption key based on the comparison indicating a match between the first one-way digital signature and the second one-way digital signature.

Some examples of the method, apparatuses, and non-transitory computer-readable medium described herein may further include operations, features, means, or instructions for selecting the defined set of messages for generating the set of one-way digital signatures from a set of multiple defined sets of messages based on a length of the first encryption key, where each defined set of messages of the plurality may be associated with a different length, and where a length associated with the defined set of messages may be the same as the length of the first encryption key.

Some examples of the method, apparatuses, and non-transitory computer-readable medium described herein may further include operations, features, means, or instructions for generating the new encryption key based on the comparison and a second comparison between the first one-way digital signature and each remaining one-way digital signatures in the set of one-way digital signatures indicating a lack of a match between the first one-way digital signature and each of the one-way digital signatures in the set of one-way digital signatures.

In some examples of the method, apparatuses, and non-transitory computer-readable medium described herein, the new encryption key may be generated based on a second measurement of a subset of subbands of the channel, each subband of the subset of subbands having a respective signal-to-interference-plus-noise ratio (SINR) that satisfies a threshold SINR.

Some examples of the method, apparatuses, and non-transitory computer-readable medium described herein may further include operations, features, means, or instructions for communicating, with the second UE, a second sidelink message that indicates the subset of subbands associated with generating the new encryption key, where the new encryption key may be generated based on the second sidelink message.

In some examples of the method, apparatuses, and non-transitory computer-readable medium described herein, generating the first encryption key may include operations, features, means, or instructions for generating a first portion of the first encryption key based on a first channel measurement of a first subset of subbands of the channel, each subband of the first subset of subbands having a respective SINR that satisfies a first threshold SINR, generating, after generating the first portion of the first encryption key, a second portion of the first encryption key based on a second channel measurement of a second subset of subbands of the channel, each subband of the second subset of subbands having a respective SINR that fails to satisfy the first threshold SINR and satisfies a second threshold SINR, and combining the first portion of the first encryption key and the second portion of the first encryption key to form the first encryption key based on a third subset of subbands of the channel having SINRs that fail to satisfy a third threshold SINR.

In some examples of the method, apparatuses, and non-transitory computer-readable medium described herein, the first portion of the first encryption key and the second portion of the first encryption key may be combined based on verifying that the first portion of the first encryption key may be the same as a first portion of the second encryption key and verifying that the second portion of the first encryption key may be the same as a second portion of the second encryption key.

In some examples of the method, apparatuses, and non-transitory computer-readable medium described herein, generating the first encryption key may include operations, features, means, or instructions for generating a first portion of the first encryption key based on a first measurement of a first subset of subbands of the channel, where the first portion of the first encryption key may be verified as being the same as a first portion of the second encryption key, receiving, from the second UE, a second sidelink message including a second portion of the second encryption key that may be encoded using the first portion of the first encryption key, and combining the first portion of the first encryption key and the second portion of the second encryption key to form the first encryption key.

In some examples of the method, apparatuses, and non-transitory computer-readable medium described herein, a first length of the new encryption key may be shorter than a second length of the first encryption key.

A method for wireless communication is described. The method may include generating, based on a measurement of a channel between a first UE and a second UE, an encryption key at the second UE, generating, at the second UE, a first one-way digital signature based on a first message from a defined set of messages and the encryption key, and transmitting, by the second UE to the first UE, a sidelink message including the first one-way digital signature to enable verification of whether the encryption key is shared at the first UE and the second UE.

An apparatus for wireless communication is described. The apparatus may include a processor, memory coupled with the processor, and instructions stored in the memory. The instructions may be executable by the processor to cause the apparatus to generate, based on a measurement of a channel between a first UE and a second UE, an encryption key at the second UE, generate, at the second UE, a first one-way digital signature based on a first message from a defined set of messages and the encryption key, and transmit, by the second UE to the first UE, a sidelink message including the first one-way digital signature to enable verification of whether the encryption key is shared at the first UE and the second UE.

Another apparatus for wireless communication is described. The apparatus may include means for generating, based on a measurement of a channel between a first UE and a second UE, an encryption key at the second UE, means for generating, at the second UE, a first one-way digital signature based on a first message from a defined set of messages and the encryption key, and means for transmitting, by the second UE to the first UE, a sidelink message including the first one-way digital signature to enable verification of whether the encryption key is shared at the first UE and the second UE.

A non-transitory computer-readable medium storing code for wireless communication is described. The code may include instructions executable by a processor to generate, based on a measurement of a channel between a first UE and a second UE, an encryption key at the second UE, generate, at the second UE, a first one-way digital signature based on a first message from a defined set of messages and the encryption key, and transmit, by the second UE to the first UE, a sidelink message including the first one-way digital signature to enable verification of whether the encryption key is shared at the first UE and the second UE.

Some examples of the method, apparatuses, and non-transitory computer-readable medium described herein may further include operations, features, means, or instructions for communicating, between the first UE and the second UE, a second sidelink message using the encryption key based on verifying that the encryption key may be shared at the first UE and the second UE.

Some examples of the method, apparatuses, and non-transitory computer-readable medium described herein may further include operations, features, means, or instructions for selecting, at the second UE, the defined set of messages from a set of multiple defined sets of messages based on a length of the encryption key, where each defined set of messages of the plurality may be associated with a different length, and where a length associated with the defined set of messages may be the same as the length of the encryption key.

In some examples of the method, apparatuses, and non-transitory computer-readable medium described herein, the first message may be randomly selected from the defined set of messages.

Some examples of the method, apparatuses, and non-transitory computer-readable medium described herein may further include operations, features, means, or instructions for generating, at the second UE, a second encryption key based on failing to verify that the encryption key may be shared at the first UE and the second UE, generating, at the second UE, a second one-way digital signature based on a second message from a second defined set of messages and the second encryption key, and transmitting, by the second UE to the first UE, a second sidelink message including the second one-way digital signature to enable verification of whether the second encryption key may be shared at the first UE and the second UE.

In some examples of the method, apparatuses, and non-transitory computer-readable medium described herein, the second encryption key may be generated based on a second measurement of a subset of subbands of the channel, each subband of the subset of subbands having a respective SINR that satisfies a threshold SINR.

Some examples of the method, apparatuses, and non-transitory computer-readable medium described herein may further include operations, features, means, or instructions for communicating, between the first UE and the second UE, a third sidelink message that indicates the subset of subbands associated with generating the second encryption key, where the second encryption key may be generated based on the third sidelink message.

In some examples of the method, apparatuses, and non-transitory computer-readable medium described herein, a first length of encryption key may be longer than a second length of the second encryption key.

In some examples of the method, apparatuses, and non-transitory computer-readable medium described herein, generating the encryption key at the second UE may include operations, features, means, or instructions for generating a first portion of the encryption key based on a first channel measurement of a first subset of subbands of the channel, each subband of the first subset of subbands having a respective SINR that satisfies a first threshold SINR, generating, after verifying that the first portion of the encryption key may be shared at the first UE and the second UE, a second portion of the encryption key based on a second channel measurement of a second subset of subbands of the channel, each subband of the second subset of subbands having a respective SINR that fails to satisfy the first threshold SINR and satisfies a second threshold SINR, and combining, the first portion of the encryption key and the second portion of the encryption key to form the encryption key based on a third subset of subbands of the channel having SINRs that fail to satisfy a third threshold SINR.

In some examples of the method, apparatuses, and non-transitory computer-readable medium described herein, generating the encryption key at the second UE may include operations, features, means, or instructions for generating a first portion of the encryption key based on a first measurement of a first subset of subbands of the channel, where the first portion of the encryption key may be verified as being shared at the first UE and the second UE, generating a second portion of the encryption key, where the second portion of the encryption key fails to be verified as being shared at the first UE and the second UE, the method further including, and transmitting, from the second UE to the first UE, a second sidelink message including the second portion of the encryption key that may be encoded using the first portion of the encryption key based on the second portion of the encryption key failing to be verified, where the encryption key corresponds to a combination of the first portion of the encryption key and the second portion of the encryption key based on transmitting the second sidelink message.

A method for wireless communication at a first UE is described. The method may include communicating, with a second UE and using a set of multiple antennas, a set of reference signals over a set of subbands, generating an encryption key at the first UE based on a set of communication parameters associated with using the set of multiple antennas to communicate the set of reference signals over the set of subbands, and communicating sidelink signaling with the second UE in accordance with the encryption key.

An apparatus for wireless communication at a first UE is described. The apparatus may include a processor, memory coupled with the processor, and instructions stored in the memory. The instructions may be executable by the processor to cause the apparatus to communicate, with a second UE and using a set of multiple antennas, a set of reference signals over a set of subbands, generate an encryption key at the first UE based on a set of communication parameters associated with using the set of multiple antennas to communicate the set of reference signals over the set of subbands, and communicate sidelink signaling with the second UE in accordance with the encryption key.

Another apparatus for wireless communication at a first UE is described. The apparatus may include means for communicating, with a second UE and using a set of multiple antennas, a set of reference signals over a set of subbands, means for generating an encryption key at the first UE based on a set of communication parameters associated with using the set of multiple antennas to communicate the set of reference signals over the set of subbands, and means for communicating sidelink signaling with the second UE in accordance with the encryption key.

A non-transitory computer-readable medium storing code for wireless communication at a first UE is described. The code may include instructions executable by a processor to communicate, with a second UE and using a set of multiple antennas, a set of reference signals over a set of subbands, generate an encryption key at the first UE based on a set of communication parameters associated with using the set of multiple antennas to communicate the set of reference signals over the set of subbands, and communicate sidelink signaling with the second UE in accordance with the encryption key.

In some examples of the method, apparatuses, and non-transitory computer-readable medium described herein, the set of communication parameters includes a rank associated with each subband of the set of subbands, the encryption key corresponding to a combination of the ranks associated with each subband.

In some examples of the method, apparatuses, and non-transitory computer-readable medium described herein, the set of communication parameters includes an eigen value distribution associated with each subband of the set of subbands, the encryption key corresponding to a combination of eigen value distributions associated with each subband.

In some examples of the method, apparatuses, and non-transitory computer-readable medium described herein, the set of communication parameters includes a conditional value associated with each subband of the set of subbands, each conditional value being a ratio of a maximum eigen value of a respective subband to a minimum eigen value of the respective subband and the encryption key corresponds to a combination of the conditional values associated with each subband.

In some examples of the method, apparatuses, and non-transitory computer-readable medium described herein, the set of communication parameters includes a precoding matrix indicator (PMI) associated with each subband of the set of subbands, the encryption key corresponding to a combination of the PMIs associated with each subband.

Some examples of the method, apparatuses, and non-transitory computer-readable medium described herein may further include operations, features, means, or instructions for receiving, from a network entity, a message including a seed that indicates the set of multiple antennas to use to communicate with the second UE and the set of subbands over which to communicate with the second UE.

DETAILED DESCRIPTION

Figure 1:
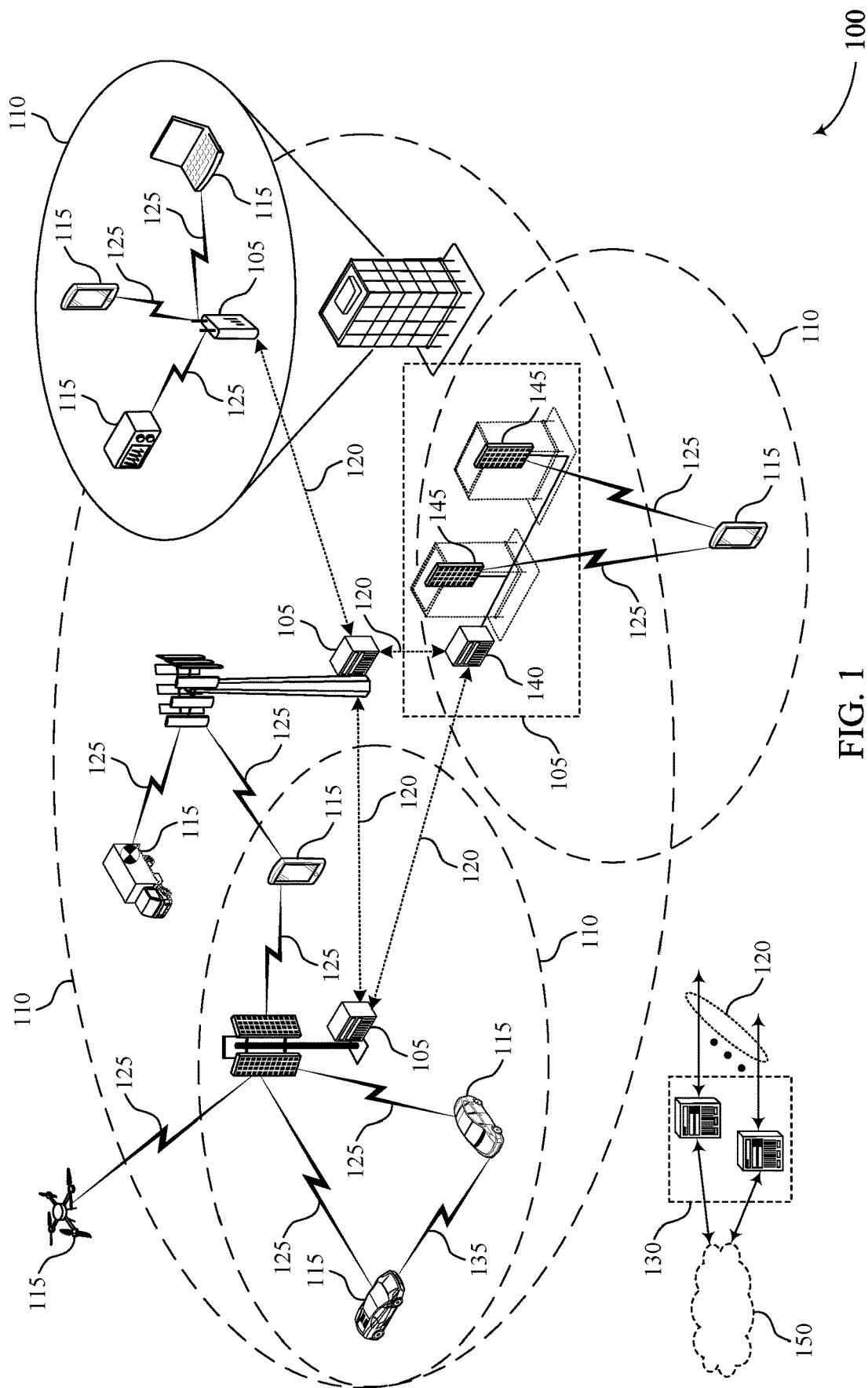
FIGS. 1 and 2 illustrate examples of wireless communications systems that support encryption key generation and verification techniques in accordance with aspects of the present disclosure.

Some wireless communication systems may support access links (e.g., a Uu link) and sidelinks (e.g., a PC5 link) for communications between communication devices. Access links may refer to communication links through which a communication device (e.g., a user equipment (UE)) may access a network of a wireless communications system, such as a communication link between a UE and one or more components of a base station. Sidelinks may refer to any communication link between similar communication devices (e.g., a communication link between UEs, or a backhaul link between base stations). In some wireless communications systems, communication devices may communicate signaling that is encrypted using an encryption key (e.g., a secret key) to increase a security of the signaling and protect the signaling from being decoded by eavesdropping devices (e.g., other wireless devices or unintended receivers attempting to detect or decode the signaling). In some cases, such as for communications between a UE and a base station over an access link, symmetrical encryption keys (e.g., same encryption keys) may be generated based on a pre-shared secret or a prior configured base key that is known to the UE and the base station. For sidelink communications however, a pre-shared secret or base key that is known to all sidelink UEs of a group may decrease the security of generated encryption keys. For example, the pre-shared secret or base key may enable an eavesdropping UE to generate a same encryption key as two UEs attempting to securely communicate over a sidelink channel and to perform unwanted eavesdropping.

In some examples, the two UEs may increase a security of encrypted communications (e.g., reduce a likelihood that the encryption key is determined by an eavesdropping device) by generating symmetrical encryption keys separately and independently at each UE based on a measurement of the sidelink channel between the two UEs. The same encryption key may be generated independently by both UEs due to a reciprocity of the sidelink channel between the two UEs. In some cases, however, the independently generated encryption keys may be different from each other, and as a result, the UEs may be unable to securely communicate over the sidelink channel using the encryption keys. A key verification mechanism may allow each UE to securely determine whether the generated keys are the same or different, and consequently whether the key generation was successful or unsuccessful.

Techniques, systems, and devices are described herein to support the independent generation of encryption keys by sidelink UEs and verification of whether the independently generated encryption keys are the same. For example, a first UE and a second UE may independently generate a first encryption key and a second encryption key, respectively. The first UE and the second UE may be configured with or otherwise store a defined set of messages that enables verification of whether the first encryption key and the second encryption key are the same. For example, the second UE may generate a first one-way digital signature using the second encryption key and a first message from the defined set of messages and may transmit a sidelink message containing the first one-way digital signature to the first UE.

In response to the sidelink message, the first UE may generate a set of one-way digital signatures using the first encryption key and the defined set of messages including the first message. If the first encryption key is the same as the second encryption key, then a one-way digital signature of the set of one-way digital signatures that is generated by the first UE using the first message and the first encryption key will match the first one-way digital signature. Accordingly, the first UE may compare the first one-way digital signatures to the set of one-way digital signatures to determine whether the first one-way digital signatures matches one of the set of one-way digital signatures. If there is a match, the first UE may determine that the first encryption key and the second encryption key are the same and may communicate sidelink signaling with the second UE using the first encryption key. Alternatively, if there is a lack of a match, the first UE may determine that the first encryption key and the second encryption key are different. Here, the first UE and the second UE may generate new encryption keys (e.g., using a subset of subbands of a sidelink channel, using sequential verification techniques described herein) and may generate new one-way digital signature(s) for verifying whether the new encryption keys are the same.

In some examples, the first UE and the second UE may communicate over the sidelink channel using multiple antennas. Here, the first UE and the second UE may be configured to generate the encryption keys based on communication parameters associated with communicating using the multiple antennas. For example, the first UE and the second UE may generate the encryption keys based on a rank of each subband of the sidelink channel over which the first UE and the second UE communicate, an eigen value distribution of each subband, a conditional value of each subband (e.g., a ratio of a maximum eigen value of the subband to a minimum value of the subband), or a precoding matrix indicator (PMI) associated with each subband.

Aspects of the subject matter described in this disclosure may be implemented to realize one or more of the following potential improvements, among others. The techniques employed by the described communication devices may enable a UE to securely and independently generate an encryption key for sidelink messages and verify whether the encryption key is shared at another UE with which the UE communicates the sidelink messages. Independent generation of an encryption key may increase a security of the encryption key and reduce a likelihood that an eavesdropping device may generate the same encryption key. Additionally, using one-way digital signatures to verify generation of a same encryption key may enable encryption key verification without the risk of exposing the generated encryption key to eavesdropping devices. For example, a one-way digital signature may not reveal any portion of the generated encryption key to an eavesdropping device, and an eavesdropping device may be unable to reproduce the generated encryption key from the one-way digital signature due to the one-way nature of the one-way digital signature. However, if the other UE generates the same encryption key, the other UE may be able to reproduce the same one-way digital signature and verify generation of the same encryption key. Therefore, sidelink communication security may be increased and eavesdropping may be prevented. In some examples, encryption key generation and verification for sidelink communications may improve coordination between communication devices, and increase reliability, among other benefits.

Aspects of the disclosure are initially described in the context of wireless communications systems. Aspects of the disclosure are additionally described in the context of a message diagram, key generation diagrams, and process flows. Aspects of the disclosure are further illustrated by and described with reference to apparatus diagrams, system diagrams, and flowcharts that relate to encryption key generation and verification techniques.

FIG. 1 illustrates an example of a wireless communications system 100 that supports encryption key generation and verification techniques in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

As described herein, a base station 105 may include one or more components that are located at a single physical location or one or more components located at various physical locations, and any one or more of such components may be referred to herein as a network entity or a network device. In examples in which the base station 105 includes components that are located at various physical locations, the various components may each perform various functions such that, collectively, the various components achieve functionality that is similar to a base station 105 that is located at a single physical location. As such, a base station 105 or network entity described herein may equivalently refer to a standalone base station (also known as a monolithic base station) or a base station 105 including network entity components that are located at various physical locations or virtualized locations (also known as a disaggregated base station 105). In some implementations, such a base station 105 including network entity components that are located at various physical locations may be referred to as or may be associated with a disaggregated radio access network (RAN) architecture, such as an Open RAN (O-RAN) or Virtualized RAN (VRAN) architecture. In some implementations, such network entity components of a base station 105 may include or refer to one or more of a central unit (or centralized unit CU), a distributed unit (DU), or a radio unit (RU).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, the wireless communications system 100 may be an example of a sidelink network. Here, the sidelink network may support one or more resource allocation modes to coordinate sidelink communications between UEs 115 (e.g., over D2D communication links 135, over PC5 links). For example, the sidelink network may be configurable to operate according to a Mode 1 resource allocation mode and/or a Mode 2 resource allocation mode. While operating in Mode 1, the sidelink network (e.g., sidelink communications over the sidelink network) may be managed (e.g., coordinated) by a base station 105. For example, during Mode 1 operation, the base station 105 may manage sidelink resource allocation over the sidelink network.

While operating in Mode 2, the sidelink network may not be managed or coordinated by the base station 105. Without coordination or management of sidelink resources of the sidelink network during the Mode 2 operation, UEs 115 may follow contention-based access procedures in which the various UEs 115 may reserve sidelink resources of the sidelink network. For example, during Mode 2 operation, a UE 115 may monitor the sidelink network to determine if other UEs 115 are attempting to transmit over the sidelink network. For instance, the UE 115 may decode one or more reservation messages (e.g., sidelink control channel transmissions such as sidelink control information (SCI) messages, SCI-1 messages, SCI-2 messages, request-to-send messages, or some other sidelink control channel transmissions) and may determine which sidelink resources are reserved for other sidelink communications and which sidelink resources are available for sidelink communications based on the reservation messages.

In some examples, the UE 115 may determine whether a sidelink resource is reserved based on measuring a reference signal received power (RSRP) of an associated reservation message (e.g., the sidelink resource may be determined to be reserved if the RSRP meets or exceeds a threshold). In some cases, the UE 115 may determine which sidelink resources are available for sidelink communications based on reservation messages decoded during a sensing window, where the sensing window corresponds to some duration of time prior to the arrival of a packet of information. In some examples, the packet arrival may trigger the UE 115 to determine which sidelink resources are available and to reserve sidelink resources.

In some examples, UEs 115 may be configured with one or more sidelink resource pools from which to select and reserve sidelink resources (e.g., during Mode 2 operation). In some cases, sidelink resource pools may include transmit sidelink resource pools (e.g., sets of sidelink resources over which the UE 115 may transmit sidelink messages) and receive sidelink resource pools (e.g., sets of sidelink resources over which the UE 115 may receive sidelink messages). The sidelink resource pools may be configured for Mode 1 communications or for Mode 2 communications. In some examples, a sidelink resource pool configuration for a sidelink resource pool may include a physical sidelink shared channel (PSSCH) configuration, a physical sidelink control channel (PSCCH) configuration, a physical sidelink feedback channel (PSFCH) configuration, a quantity of subchannels in the sidelink resource pool, a subchannel size (e.g., bandwidth), a starting resource block of the sidelink resource pool, a modulation and coding scheme (MCS) associated with the sidelink resource pool, a sensing configuration, a power control configuration, or a combination thereof.

The wireless communications system 100 may support the encryption of communications between communication devices to increase a security of the communications and prevent eavesdropping. For example, a UE 115 and a base station 105 may generate symmetrical encryption keys for encrypting communications over an access link using a pre-shared secret or a base key that is known to the UE 115 and the base station 105 but unknown to eavesdropping devices. Accordingly, the UE 115 and the base station 105 may generate a same encryption key using the pre-shared secret or the base key and may securely communicate over the access link using the encryption key.

Additionally or alternatively, two UEs 115 communicating over a sidelink channel may independently generate respective encryption keys and may verify whether the respective encryption keys are the same. The two UEs 115 (e.g., a first UE 115 and a second UE 115) may generate the respective encryption keys without the use of a pre-shared secret or a base key. For example, it may be unknown as to whether the first UE 115 and the second UE 115 have a same pre-shared secret or base key and sharing the pre-shared secret or base key may enable an eavesdropping device to decode the pre-shared secret or base key and generate the encryption key using the pre-shared secret or base key. Additionally, pre-sharing a same secret or base key with UEs 115 of a group of UEs 115 may enable a peer UE 115 (e.g., a UE 115 other than the first UE 115 and the second UE 115) to eavesdrop on sidelink communications between the first UE 115 and the second UE 115. Accordingly, the first UE 115 and the second UE 115 may instead independently generate the respective encryption keys, for example, based on a measurement of the sidelink channel (e.g., measurements of reference signals communicated over subbands of the sidelink channel) or based on communication parameters associated with communicating over the sidelink channel using multiple antennas.

In some cases, the independently generated encryption keys may different. Accordingly, to verify whether the encryption keys are the same, the first UE 115 and the second UE 115 may communicate one-way digital signatures that enable the verification without sharing the generated encryption keys. For example, the second UE 115 may transmit a first one-way digital signature to the first UE 115 that is generated using the encryption key generated by the second UE 115 and a first message of a defined set of messages. The first UE 115 may generate a set of one-way digital signatures using the encryption key generated by the first UE 115 and each message of the defined set of messages. The first UE 115 may determine whether the first one-way digital signature matches one of the set of one-way digital signatures, which may indicate that the encryption keys are the same as the first UE 115 may be unable to reproduce the first one-way digital signature using the defined set of messages if the encryption keys are different. Accordingly, if there is a match, the first UE 115 may verify that the encryption keys are the same, and the first UE 115 and the second UE 115 may securely communicate over the sidelink channel using the encryption key. Alternatively, if there is a lack of a match, the first UE 115 may verify that the encryption keys are different, and the first UE 115 and the second UE 115 may independently generate and verify new encryption keys.

Figure 2:
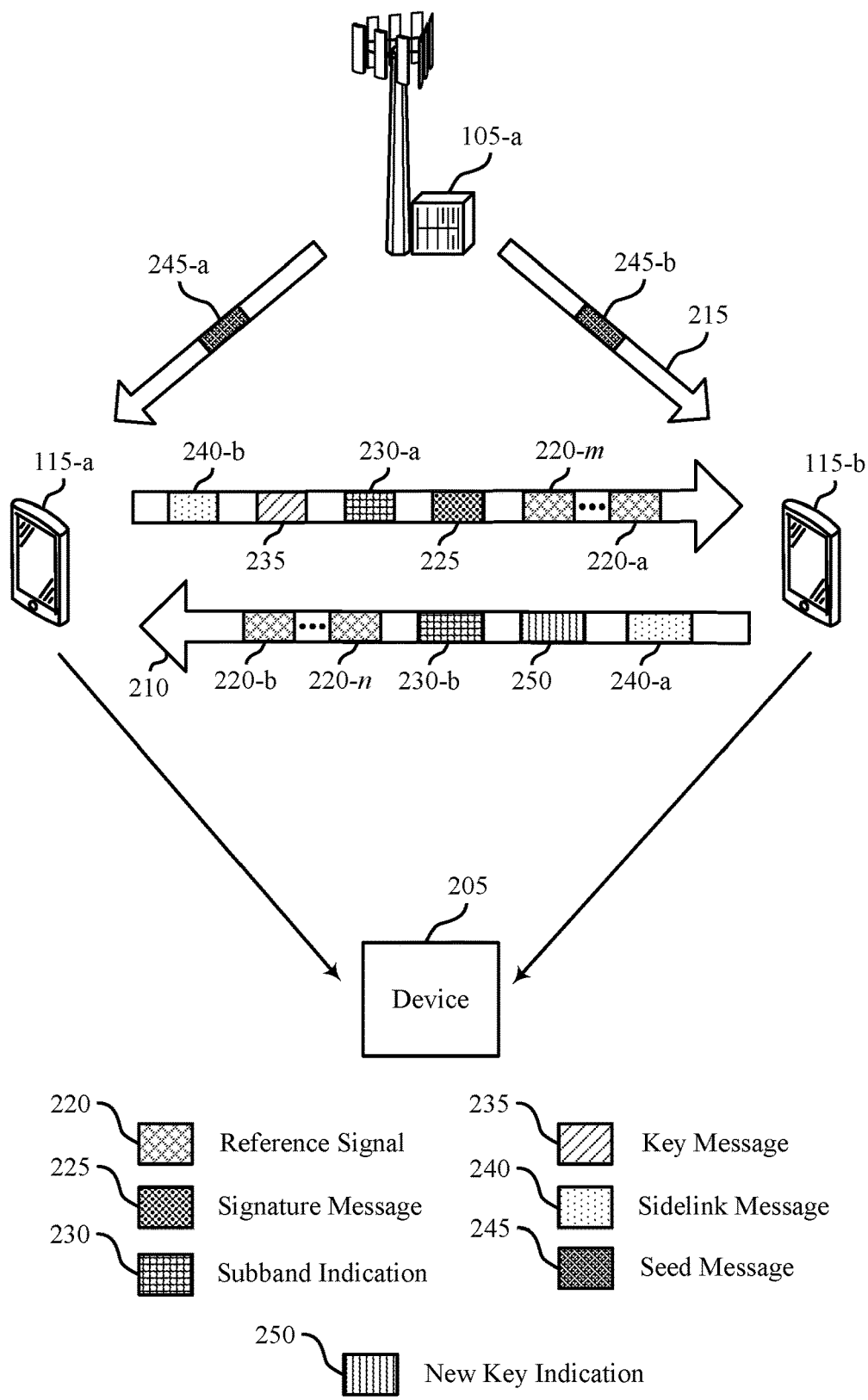

FIG. 2 illustrates an example of a wireless communications system 200 that supports encryption key generation and verification techniques in accordance with aspects of the present disclosure. The wireless communications system 200 may implement or be implemented by aspects of wireless communications system 100. For example, the wireless communications system 200 may include a base station 105-*a*, a UE 115-*a*, and a UE 115-*b*, which may be examples of the corresponding devices as described with reference to FIG. 1. The wireless communications system 200 may support encryption key generation and verification for sidelink communications, which may support increased communication security, eavesdropping prevention, encryption key agreement between sidelink devices, increased reliability, and coordination between devices, among other benefits.

The wireless communications system 200 may support communications between the UE 115-*a* and the UE 115-*b*. For example, the UE 115-*a* and the UE 115-*b* may communicate sidelink messages over communication links 210. In some examples, the communication links 210 may be examples of a sidelink (e.g., a PC5 link) or a D2D communication link 135 described with reference to FIG. 1. The wireless communications system 200 may also support communications between the base station 105-*a* and the UE 115-*a* and between the base station 105-*a* and the UE 115-*b*. For example, the UE 115-*a* and the UE 115-*b* may communicate uplink and downlink messages with the base station 105-*a* over respective communication links 215. In some examples, the communication links 215 may be examples of an access link (e.g., a Uu link) or a communication link 125 described with reference to FIG. 1.

The wireless communications system 200 may support the encryption of communications between the UE 115-*a* and the UE 115-*b* to increase a security of the communications and prevent eavesdropping. For example, the wireless communications system 200 may include a device 205 (e.g., another UE 115) which may be an example of an eavesdropping device. That is, the device 205 may attempt to eavesdrop (e.g., listen in on, intercept, decrypt) the communications between the UE 115-*a* and the UE 115-*b*. To secure the communications from eavesdropping by the device 205, the UE 115-*a* and the UE 115-*b* may be configured to generate an encryption key that is unknown to the device 205 and to use the encryption key to encrypt and decrypt the communications.

To increase a security of the encryption key and reduce a likelihood that the encryption key may be determined by the device 205, the UE 115-*a* and the UE 115-*b* may be configured to independently generate respective encryption keys and then verify whether the respective encryption keys are the same. In some examples, the UE 115-*a* and the UE 115-*b* may independently generate the respective encryption keys based on respective measurements of a sidelink channel over which the UE 115-*a* and the UE 115-*b* communicate (e.g., a measurement of the communication links 210). For example, the UE 115-*a* and the UE 115-*b* may communicate reference signals 220 over a set of N subbands of the sidelink channel (e.g., which may span all or a portion of a system bandwidth of the sidelink channel) that the UE 115-*a* and the UE 115-*b* may measure to obtain a channel measurement associated with each subband. For instance, the UE 115-*a* may transmit a reference signal 220-*a* through a reference signal 220-*m* over the N subbands (e.g., at a time t), and the UE 115-*b* may transmit a reference signal 220-*b* through a reference signal 220-*n* over the N subbands (e.g., at a time t+d).

The UE 115-*a* may measure the reference signals 220-*b* through 220-*n* and generate an encryption key $K_1$ based on the measurements of the reference signals 220-*b* through 220-*n*. For example, the UE 115-*a* may measure and quantize an amplitude of a respective reference signal 220-*b* through 220-*n* received in each subband to k bits. The UE 115-*a* may combine (e.g., concatenate) the quantized amplitudes to generate the encryption key $K_1$ having a length of Nk bits. Alternatively, the UE 115-*a* may measure and quantize a phase of the respective reference signal 220-*b* through 220-*n* received in each subband to k bits and may combine the quantized phases to generate the encryption key $K_1$ having the length of Nk bits. Similarly, the UE 115-*b* may measure the reference signals 220-*a* through 220-*m* and may generate an encryption key $K_2$ having a length of Nk bits based on the measurements of the reference signals 220-*a* through 220-*m* (e.g., based on quantized amplitudes or phases of the reference signals 220-*a* through 220-*m*).

In some examples, the UE 115-*a* and the UE 115-*b* may select the N subbands of the sidelink channel for communicating the reference signals 220 based on a seed R. For example, the base station 105-*a* (e.g., or a roadside unit associated with the base station 105-*a*) may transmit a seed message 245-*a* to the UE 115-*a* and a seed message 245-*b* to the UE 115-*b* that each include the seed R. The seed R may map to the set of N subbands. For example, the seed R may map to $\{c_1, c_2, \ldots, c_N\}$, where $c_i \in \{1, 2, \ldots, N\}$ denotes a subband and N is the total number of subbands.

In some examples, the UE 115-*a* and the UE 115-*b* may generate the encryption key $K_1$ and the encryption key $K_2$, respectively, based on a set of communication parameters associated with communicating over the sidelink channel using multiple antennas. For example, the UE 115-*a* and the UE 115-*b* may communicate the reference signals 220 over the N subbands using multiple antennas. In some cases, the seed R may map to a number of transmit/receive antennas A (e.g., A≥2) that the UE 115-*a* and the UE 115-*b* are to use to communicate the reference signals 220 over the subbands $c_1$ to $c_N$ mapped by the seed R. Communication parameters associated with communicating using the A antennas (e.g., subband rank, subband eigen value distribution, subband conditional value, subband PMI) may be used to generate the encryption key $K_1$ and the encryption key $K_2$.

For example, the UE 115-*a* and the UE 115-*b* may generate the encryption key $K_1$ and the encryption key $K_2$, respectively, based on a rank associated with each subband $c_1$ to $c_N$. For instance, the UE 115-*a* may determine the rank associated with each subband c (e.g., a quantity of spatial layers used for communicating over each subband c) and may combine (e.g., concatenate) the ranks to generate the encryption key $K_1$. As an example, the encryption key $K_1$ generated based on subband rank may be $K_1$: {rank(H($c_1$)), rank(H($c_2$)), . . . , rank(H($c_N$))}, where H($c_i$) correspond to the channel matrix of subband $c_i$. Similarly, the UE 115-*b* may determine the rank associated with each subband c and may combine the ranks to generate the encryption key $K_2$.

Alternatively, the UE 115-*a* and the UE 115-*b* may generate the encryption key $K_1$ and the encryption key $K_2$, respectively, based on an eigen value distribution associated with each subband $c_1$ to $c_N$. For example, the UE 115-*a* may determine (e.g., calculate, compute) an eigen value distribution m for a given subband c according to Equation 1 below:

$$m(c) = \Sigma_{i=1}^{A} \lambda_i^2(c) \quad (1)$$

Here, A corresponds to the number of transmit/receive antennas and $\lambda_i(c)$ corresponds to an eigen value of the channel matrix H of subband c. In some examples, $m(c) = \Sigma_{k=1}^{M} \lambda_k^2(c) = \Sigma_{i,j} |h_{i,j}(c)|^2$, where $\Sigma_{i,j} |h_{i,j}(c)|^2$ corresponds to the power gain of the channel matrix at subband c. In some cases, the UE 115-*a* may combine (e.g., concatenate) the values of m(c) for each subband $c_1$ to $c_N$ to generate the encryption key $K_1$. For example, the encryption key $K_1$ generated based on eigen value distribution may be $K_1$: {m($c_1$), m($c_2$), . . . , m($c_N$)}. In some other cases, the UE 115-*a* may quantize m(c) for each subband $c_1$ to $c_N$, where m̂(c) corresponds to the quantized value of m(c), and the UE 115-*a* may combine (e.g., concatenate) the values of M(c) for each subband $c_1$ to $c_N$ to generate the encryption key $K_1$. For example, the encryption key $K_1$ generated based on quantized eigen value distribution may be $K_1$: {m̂($c_1$), m̂($c_2$), . . . , m̂($c_N$)}. Similarly, the UE 115-*b* may determine the (e.g., quantized) eigen value distribution associated with each subband c and may combine the eigen value distributions to generate the encryption key $K_2$.

Alternatively, the UE 115-*a* and the UE 115-*b* may generate the encryption key $K_1$ and the encryption key $K_2$, respectively, based on a conditional value associated with each subband $c_1$ to $c_N$. For example, a conditional value l associated with a subband c may correspond to a ratio of a maximum eigen value λ of the subband c to a minimum eigen value λ of the subband c. For instance, the UE 115-*a* may calculate a conditional value as $$l(c) = \frac{\max \lambda(c)}{\min \lambda(c)},$$

and l̂(c) may be a quantized conditional value l(c). In some cases, the UE 115-*a* may combine (e.g., concatenate) the values of l(c) for each subband $c_1$ to $c_N$ to generate the encryption key $K_1$. For example, the encryption key $K_1$ generated based on conditional values may be $K_1$: {l($c_1$), l($c_2$), . . . , l($c_N$)}. In some other cases, the UE 115-*a* may combine (e.g., concatenate) the quantized values of l(c) for each subband $c_1$ to $c_N$ to generate the encryption key $K_1$. For example, the encryption key $K_1$ generated based on conditional values may be $K_1$:{l̂($c_1$), l̂($c_2$), . . . , l̂($c_N$)}. Similarly, the UE 115-*b* may determine the (e.g., quantized) conditional values associated with each subband c and may combine the conditional values to generate the encryption key $K_2$.

Alternatively, the UE 115-*a* and the UE 115-*b* may generate the encryption key $K_1$ and the encryption key $K_2$, respectively, based on a PMI associated with each subband $c_1$ to $c_N$. For example, the UE 115-*a* and the UE 115-*b* may communicate PMIs indicating a preference for which precoder matrix should be used (e.g., based on a number of spatial layers) to communicate over each subband c. The UE 115-*a* may combine (e.g., concatenate) the PMIs to generate the encryption key $K_1$. As an example, the encryption key $K_1$ generated based on PMIs may be $K_1$: {PMI($c_1$), PMI($c_2$), . . . , PMI($c_N$)}. Similarly, the UE 115-*b* may combine the PMIs the generate the encryption key $K_2$.

The UE 115-*a* and the UE 115-*b* may communicate the reference signals 220 for encryption key generation at various times. For example, the UE 115-*a* and the UE 115-*b* may communicate the reference signals 220 when a process to establish a link between the UE 115-*a* and the UE 115-*b* over the sidelink channel begins. Additionally or alternatively, the UE 115-*a* and the UE 115-*b* may be configured to periodically communicate the reference signals 220, for example, to periodically change the encryption key used by the UE 115-*a* and the UE 115-*b* to communicate with each other. In some examples, the periodicity of communicating the reference signals 220 may be configured by the base station 105-*a* (e.g., via the roadside unit). Additionally or alternatively, the UE 115-*a* or the UE 115-*b* may request to change the encryption key, and the UE 115-*a* and the UE 115-*b* may communicate the reference signals 220 in response to the request.

In some examples, reference signals 220 may be predefined for generating the encryption keys. Here, key identifiers may be exchanged between the UE 115-*a* and the UE 115-*b* that indicate which predefined reference signals 220 are to be used for generating the encryption keys. In some other examples, source and destination identifiers of the UE 115-*a* and the UE 115-*b* may map to a sequence of reference signals 220 to be used for generating the encryption keys. For example, the last four bits of the source identifiers of the UE 115-*a* and the UE 115-*b* may map to a sequence of reference signals 220 for generating the encryption keys. In this way, the UE 115-*a* and the UE 115-*b* may each communicate the correct reference signals 220 to generate the encryption key $K_1$ and the encryption key $K_2$, respectively.

The UE 115-*a* and the UE 115-*b* may be configured to verify whether the encryption key $K_1$ is the same as the encryption key $K_2$. For example, a reciprocity of the sidelink channel may increase a likelihood that the measurements of the reference signals 220 performed by each of the UE 115-*a* and the UE 115-*b* are the same (e.g., quantized to same values) thus resulting in the encryption key $K_1$ and the encryption key $K_2$ being the same. In some cases, however, the measurements of the reference signals 220 may be different, thereby resulting in the encryption key $K_1$ and the encryption key $K_2$ being different. Accordingly, by verifying whether the encryption key $K_1$ and the encryption key $K_2$ are the same, the UE 115-*a* and the UE 115-*b* may determine whether to communicate using the same generated encryption key $K_1$, $K_2$ or to generate new encryption keys.

To verify whether the encryption key $K_1$ and the encryption key $K_2$ are the same, the UE 115-*a* may be configured to generate a one-way digital signature $y_1$ that is based on the encryption key $K_1$. For example, the UE 115-*a* may input the encryption key $K_1$ and a message $m_i$ from a defined set of messages $M_i$ into a one-way mapping function $f$ that outputs the one-way digital signature $y_1$ (e.g., $y_1 = f(m_i, K_1)$). As described in further detail in FIG. 3 below, the defined set of messages $M_i$ may include messages m having a same length as the encryption keys $K_1$ and $K_2$ (e.g., messages m having a length of Nk bits). Accordingly, the message $m_i$ may have a length of Nk bits. The UE 115-*a* may indicate the one-way digital signature $y_1$ to the UE 115-*b* by transmitting a sidelink message that includes the one-way digital signature $y_1$. For example, the UE 115-*a* may transmit a signature message 225 to the UE 115-*b* over the sidelink channel that includes the one-way digital signature $y_1$.

In response to receiving the signature message 225, the UE 115-*b* may generate a set of one-way digital signatures y based on the encryption key $K_2$ to determine whether the encryption key $K_1$ and the encryption key $K_2$ are the same. For example, the UE 115-*b* may input the encryption key $K_2$ and the messages m from the defined set of messages $M_i$ into the one-way mapping function $f$ that outputs the one-way digital signatures y (e.g., $y = f(m, K_2)$). In generating the set of one-way digital signatures y, the UE 115-*b* may generate a one-way digital signature $y_2$ using the encryption key $K_2$ and the message $m_i$ (e.g., $y_2 = f(m_i, K_2)$). Accordingly, if the encryption keys $K_1$ and $K_2$ are the same, then the one-way digital signatures $y_1$ and $y_2$ will also be the same. The message $m_i$ used by the UE 115-*a* to generate the one-way digital signature $y_1$ may be unknown to the UE 115-*b*. Thus, the UE 115-*b* may compare each of the one-way digital signatures y of the set of generated one-way digital signatures y to the one-way digital signature $y_1$ (e.g., until a match is found).

Based on the comparison, the UE 115-*b* may select between using the encryption key $K_2$ to communicate with the UE 115-*a* and generating a new encryption key K to communicate with the UE 115-*a*. For example, if the comparison indicates a match between the one-way digital signature $y_1$ and the one-way digital signature $y_2$, the UE 115-*b* may determine (e.g., verify) that the encryption keys $K_1$ and $K_2$ are the same, and the UE 115-*a* and the UE 115-*b* may communicate sidelink messages 240 using the encryption keys $K_1$ and $K_2$. For example, the UE 115-*b* may transmit a sidelink message 240-*a* to the UE 115-*a* that is encrypted using the encryption key $K_2$. Because the encryption keys $K_1$ and $K_2$ are the same, the UE 115-*a* may be able to decrypt (e.g., decode) the sidelink message 240-*a* using the encryption key $K_1$. In some examples, the sidelink message 240-*a* may include an indication that the encryption keys $K_1$ and $K_2$ are the same. In some other examples, the successful decryption of the sidelink message 240-*a* by the UE 115-*a* may constitute an implicit indication to the UE 115-*a* that the encryption keys $K_1$ and $K_2$ are the same. In some examples, the UE 115-*a* may also transmit a sidelink message 240-*b* to the UE 115-*b* using the encryption key $K_1$ based on the encryption keys $K_1$ and $K_2$ being the same.

Alternatively, if the comparison indicates a lack of a match between the one-way digital signature $y_1$ and any of the one-way digital signatures y of the set of one-way digital signatures y, the UE 115-*b* may determine that the encryption keys $K_1$ and $K_2$ are different. For example, the lack of the match may indicate to the UE 115-*b* that the one-way digital signature $y_2$ generated using the message $m_i$ is different from the one-way digital signature $y_1$. Therefore, the UE 115-*b* may determine that the encryption keys $K_1$ and $K_2$ are different.

In response to determining that the encryption keys $K_1$ and $K_2$ are different, the UE 115-*b* initiate (e.g., trigger) the generation of new encryption keys K by the UE 115-*a* and the UE 115-*b* for communicating over the sidelink channel. To indicate the lack of the match to the UE 115-*b* and initiate the new encryption key generation, the UE 115-*b* may transmit a new key indication 250 to the UE 115-*a*. In some examples, the new key indication 250 may be a sidelink feedback message that includes a negative acknowledgement (NACK) indicating the lack of the match. The new key indication 250 may be un-encrypted (e.g., not encrypted using the encryption key $K_2$), and the UE 115-*a* may decode the new key indication 250 to determine that encryption keys $K_1$ and $K_2$ are different. Based on transmitting the new key indication 250, the UE 115-*a* may generate a new encryption key $K_3$ and the UE 115-*b* may generate a new encryption key $K_4$, and the UE 115-*a* and the UE 115-*b* may proceed to verify whether the new encryption keys $K_3$ and $K_4$ are the same.

In some other examples, the UE 115-*b* may generate the new encryption key $K_4$ in response to determining that the encryption keys $K_1$ and $K_2$ are different. Here, the UE 115-*b* may generate a new one-way digital signature $y_3$ using the encryption key $K_4$ and a message $m_j$ from a defined set of messages $M_j$ and may transmit the new key indication 250 to the UE 115-*a* that includes the new one-way digital signature $y_3$. The new key indication 250 being transmitted un-encrypted may implicitly indicate to the UE 115-*a* that the encryption keys $K_1$ and $K_2$ are different. Thus, in response to receiving the new key indication 250, the UE 115-*a* may generate the new encryption key $K_3$ and may generate a set of new one-way digital signatures y using the new encryption key $K_3$ and the defined set of messages $M_j$ to verify whether the encryption keys $K_3$ and $K_4$ are the same.

The UE 115-*a* and the UE 115-*b* may generate the new encryption keys $K_3$ and $K_4$, respectively, using techniques to increase a likelihood that the encryption keys $K_3$ and $K_4$ are the same. For example, the UE 115-*a* and the UE 115-*b* may use a subset of B subbands of the set of N subbands to communicate reference signals 220 for generation of the encryption keys $K_3$ and $K_4$. The subbands c of the subset of B subbands may each have a respective signal-to-interference-plus-noise ratio (SINR) greater than a threshold SINR. In this way, a likelihood that the measurements of the reference signals 220 are quantized to same values by the UE 115-*a* and the UE 115-*b* may be increased. In some examples, the UE 115-*a* and the UE 115-*b* may communicate a subband indication 230 over the sidelink channel to indicate the subset of B subbands. For example, the UE 115-*a* may transmit a subband indication 230-*a* or the UE 115-*b* may transmit a subband indication 230-*b*, where the subband indications 230 indicates indices of the subbands c included in the subset of B subbands. The UE 115-*a* and the UE 115-*b* may verify whether the encryption keys $K_3$ and $K_4$ are the same by generating and communicating new one-way digital signatures y based on the encryption keys $K_3$ and $K_4$. Additional details related to generating and verifying encryption keys K using a subset of B subbands are described with reference to FIG. 4A below.

In some examples, the UE 115-*a* and the UE 115-*b* may generate the encryption keys $K_1$ and $K_2$, respectively, or generate the new encryption keys $K_3$ and $K_4$ using sequential verification techniques. For example, the UE 115-*a* and the UE 115-*b* may sequentially generate and verify portions of the encryption keys K based on different subsets of subbands c of the set of N subbands. After sequentially generating and verifying the portions of the encryption keys K, the UE 115-*a* and the UE 115-*b* may combine (e.g., concatenate) the verified portions of the encryption keys K to generate a same encryption key K. Additional details related to generating and verifying encryption keys K using sequential verification techniques are described with reference to FIG. 4B below.

In some examples, the UE 115-*a* and the UE 115-*b* may generate the encryption keys $K_1$ and $K_2$, respectively, or generate the new encryption keys $K_3$ and $K_4$ using a partially verified encryption key $K_v$. For example, the UE 115-*a* and the UE 115-*b* may generate and verify a portion of an encryption key K that corresponds to a subset of subbands c of the set of N subbands, where $K_v$ corresponds to the verified portion of the encryption key K. The UE 115-*a* may generate a remaining portion of the encryption key K that corresponds to remaining subbands c of the set of N subbands, where $K_u$ corresponds to the remaining portion of the encryption key K. To indicate the remaining portion of the encryption key K to the UE 115-*b*, the UE 115-*a* may encrypt $K_u$ using $K_v$ and transmit a key message 235 to the UE 115-*b* that includes $K_u$ encrypted using $K_v$. As $K_v$ was previously verified at the UE 115-*b*, the UE 115-*b* may decrypt (e.g., decode) the key message 235 to determine $K_u$ and may combine $K_v$ and $K_u$ to generate the encryption key K. Additional details related to generating and verifying encryption keys K using partially verified encryption keys are described with reference to FIG. 4C below.

Figure 3:
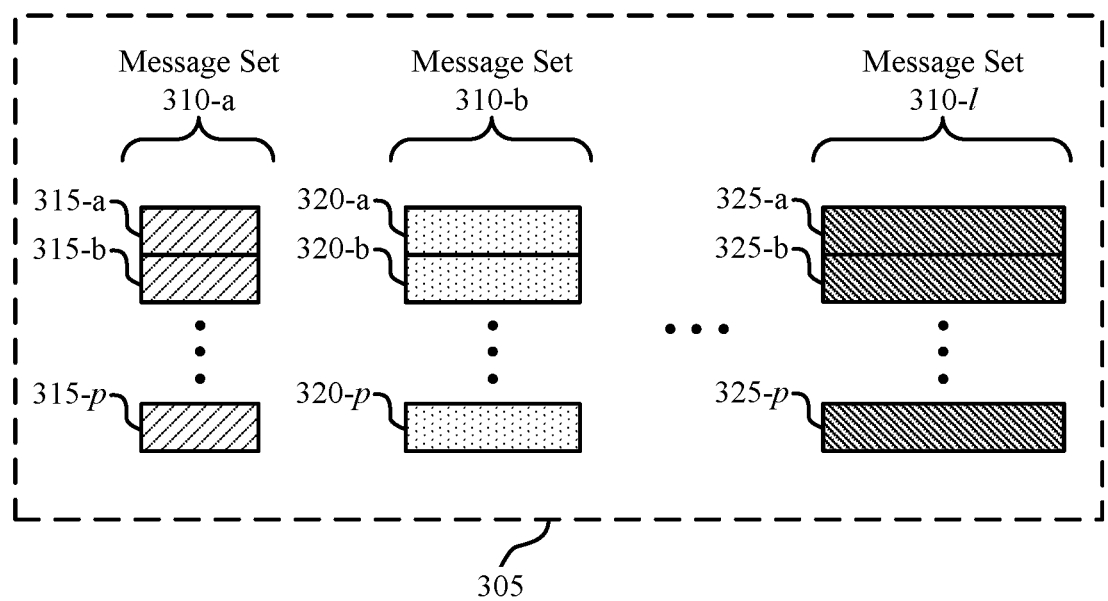
FIG. 3 illustrates an example of a message diagram that supports encryption key generation and verification techniques in accordance with aspects of the present disclosure.

FIG. 3 illustrates an example of a message diagram 300 that supports encryption key generation and verification techniques in accordance with aspects of the present disclosure. The message diagram 300 may implement or be implemented by aspects of the wireless communications systems 100 and 200 as described with reference to FIGS. 1 and 2, respectively. For example, the message diagram 300 may be implemented by a UE 115 to support encryption key verification for sidelink communications.

The message diagram 300 depicts a set of defined message sets 305 that may be configured or otherwise stored at the UE 115 to support encryption key verification. For example, the UE 115 may be configured with or otherwise store the set of defined message sets 305 that includes/messages sets 310 (e.g., a message set 310-*a* through a message set 310-*l*), where a message set 310 may be an example of a defined message set M described with reference to FIG. 2. Each message set 310 may be associated with a different length of an encryption key K that the UE 115 may generate. For example, the message set 310-*a* may include messages 315 having a length $L_1$ (e.g., including $L_1$ bits, where $L_1$ is a positive integer), the message set 310-*b* may include messages 320 having a length $L_2$, and so on up to the message set 310-*l*, which may include messages 325-*a*, 325-*b*, 325-*c* having a length $L_l$. In other words, all of the messages within a given message set 310 may be of equal length L, and a length L across different message sets 310 may be different. In the example of FIG. 3, $L_1 < L_2 < \ldots < L_l$. In some examples, the length $L_i$ of a given message set 310-*i* may be $L_i = 2^j$ for j∈positive integers.

Each of the message sets 310 may include p defined messages that may be used to generate one-way digital signatures (e.g., one-way digital signatures y described with reference to FIG. 2) for verifying whether an encryption key is shared at another UE 115 with which the UE 115 communicates. For example, the message set 310-*a* may include a message 315-*a*, a message 315-*b*, and so on up to a message 315-*p*. The message set 310-*b* may include a message 320-*a*, a message 320-*b*, and so on up to a message 320-*p*. The UE 115 may select a message set 310 for generating a one-way digital signature y from the set of defined message sets 305 based on a length of an encryption key K generated by the UE 115. For example, if the UE 115 generates an encryption key K having a length of $L_2$ bits, the UE 115 may select the message set 310-*b* for generating one or more one-way digital signatures y.

If the UE 115 is configured to transmit a one-way digital signature y to a second UE 115 for verification of the encryption key K by the second UE 115 (e.g., configured to transmit a signature message 225 to the second UE 115 that include a one-way digital signature $y_1$), the UE 115 may select a message 320 from the message set 310-*b*, generate the one-way digital signature y using the encryption key and the selected message 320, and transmit the one-way digital signature y to the second UE. Alternatively, if the UE 115 receives an indication of a one-way digital signature y from the second UE 115 (e.g., receives a signature message 225), the UE 115 may generate a set of one-way digital signatures y using the encryption key K and each message 320 of the message set 310-*b*. The UE 115 may compare the set of one-way digital signatures y to the one-way digital signature y received from the second UE 115 to determine whether the there is a match to one of the set of one-way digital signatures. If there is a match, the UE 115 may determine that the encryption key K is shared at the second UE 115. Otherwise, the UE 115 may determine that encryption key K is not shared at the second UE 115 and may generate a new encryption key K for verification.

Figure 4A:
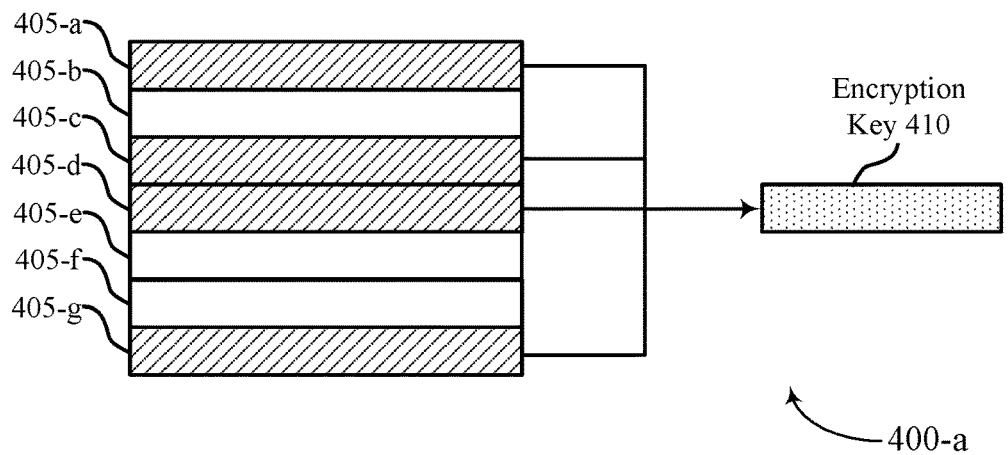
FIGS. 4A, 4B, and 4C illustrate examples of key generation diagrams that support encryption key generation and verification techniques in accordance with aspects of the present disclosure.
Figure 4B:
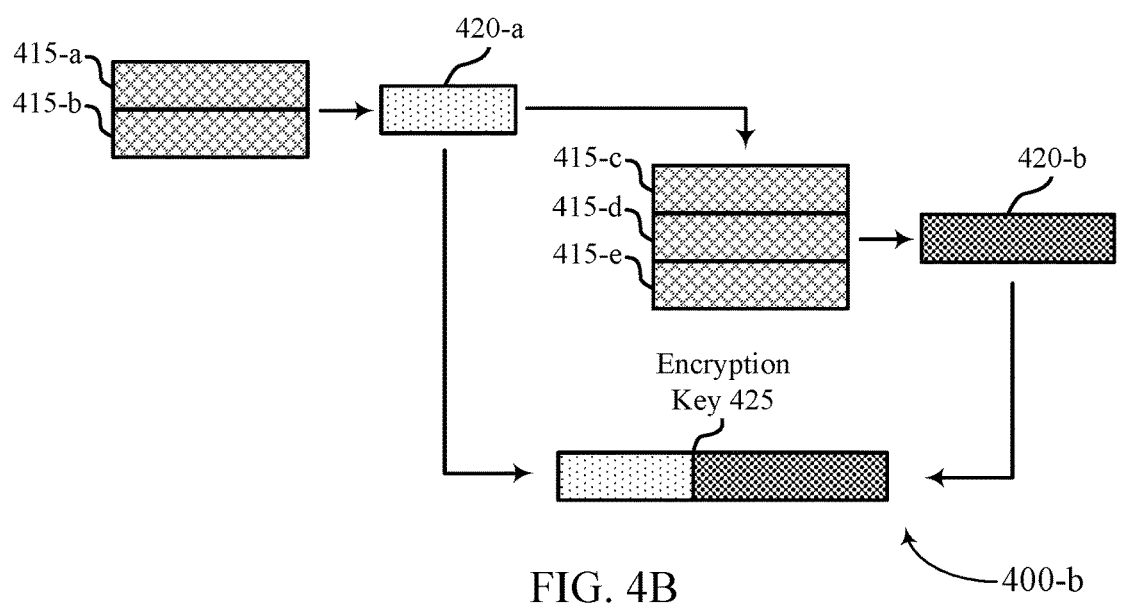
Figure 4C:
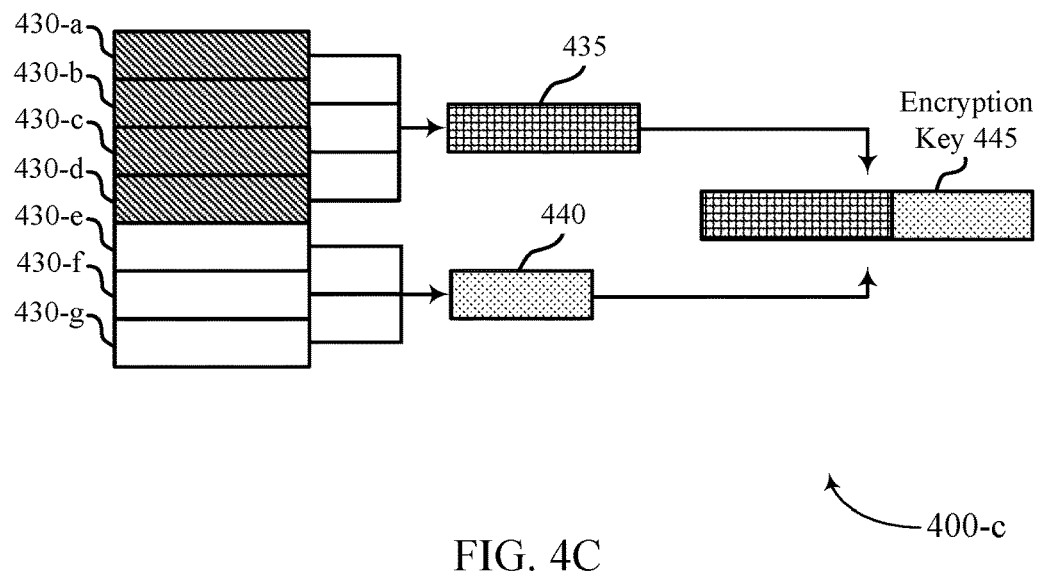

FIGS. 4A, 4B, and 4C illustrate examples of key generation diagrams 400 that support encryption key generation and verification techniques in accordance with aspects of the present disclosure. The key generation diagrams 400 may implement or be implemented aspects of the wireless communications systems 100 and 200 as described with reference to FIGS. 1 and 2, respectively. For example, the key generation diagrams 400 may be implemented by a UE 115 to support encryption key generation for sidelink communications.

FIG. 4A depicts a key generation diagram 400-*a* in which a first UE 115 may generate an encryption key 410 using a subset of subbands 405 of a set of subbands 405 (e.g., a subset of B subbands of a set of N subbands described with reference to FIG. 2). For example, the first UE 115 may communicate with a second UE 115 over subbands 405 of a sidelink channel. In some examples, the first UE 115 and the second UE 115 may communicate a sidelink message that indicates indices corresponding to the subbands 405 of the subset of subbands 405 used in generating the encryption key 410 (e.g., a subband indication 230). For example, the sidelink message may indicate indices corresponding to a subband 405-*a*, 405-*c*, 405-*d*, and 405-*g* of the sidelink channel. The first UE 115 and the second UE 115 may communicate reference signals (e.g., reference signals 220) over the indicated subset of subbands 405 (e.g., over subbands 405-*a*, 405-*c*, 405-*d*, and 405-*g*), and the first UE 115 may generate the encryption key 410, for example, by combining quantized amplitudes or phases of the communicated reference signals.

Each subband 405 may be associated with a respective SINR, where a quality and reliability of sidelink messages communicated over a given subband 405 may increase as the SINR of the given subband 405 increases. In some examples, the first UE 115 (e.g., and the second UE 115) may be configured to generate the encryption key 410 using a subset of subbands 405 that are each associated with an SINR that satisfies (e.g., is greater than, is greater than or equal to) a threshold SINR. For example, the subbands 405-*a*, 405-*c*, 405-*d*, and 405-*g* of the sidelink channel may each have a respective SINR that satisfies the threshold SINR, while a subband 405-*b*, 405-*e*, and 405-*f* may each have a respective SINR that fails to satisfy the threshold SINR. The first UE 115 may determine the subbands 405 having an SINR satisfying the threshold SINR and may communicate reference signals (e.g., reference signals 220) with the second UE 115 over the determined subbands 405. The first UE 115 may measure the reference signals and may generate the encryption key 410, for example, by combining quantized amplitudes or phases of the communicated reference signals.

Based on the encryption key 410 being generated using a subset of the subbands 405 of the sidelink channel, the encryption key 410 may have a length less than an encryption key generated using the set of subbands 405 of the sidelink channel. For example, if the first UE 115 quantizes each reference signal measurement to k bits, the encryption key 410 may have a length of 4*k bits based on using four subbands 405 to communicate the reference signals (e.g., subbands 405-*a*, 405-*c*, 405-*d*, and 405-*g*), while an encryption key generated using the set of subbands 405 may have a length of 7*k bits. In some examples, however, generating the encryption key 410 using the subset of the subbands 405 may increase a likelihood that the encryption key 410 is shared at the first UE 115 and the second UE 115. For example, by using fewer subbands 405 to generate the encryption key 410, there are fewer reference signal measurements to be quantized to a same value in order to generate an encryption key 410 that is shared at the first UE 115 and the second UE 115, thereby increasing the likelihood that the encryption key 410 is shared at the first UE 115 and the second UE 115. Additionally, using subbands 405 having SINRs that satisfy the threshold SINR may increase a probability that reference signals communicated over the subbands 405 may be quantized to a same value.

In some examples, the encryption key 410 may correspond to a new encryption key that is generated in response to a previously generated encryption key failing to be verified. For example, the first UE 115 may be configured to generate the encryption key 410 in response to determining that a previously generated encryption key at the first UE 115 was different from a previously generated encryption key at the second UE 115.

FIG. 4B depicts a key generation diagram 400-*b* in which a first UE 115 and a second UE 115 may generate an encryption key 425 by sequentially verifying portions of the encryption key 425 that correspond to different subsets of subbands 415 of a sidelink channel. For example, the first UE 115 may communicate with the second UE 115 over a set of subbands 415, and each subband 415 may be associated with a respective SINR. The first UE 115 and the second UE 115 may be configured to measure the SINR of each subband 415 and communicate their respective SINR measurements for each subband 415. The first UE 115 and the second UE 115 may select a first subset of subbands 415 having SINRs (e.g., measured by both the first UE 115 and the second UE 115) that satisfy (e.g., are greater than, greater than or equal to) a first threshold SINR. For example, the first UE 115 and the second UE 115 may select a subband 415-*a* and a subband 415-*b* of the sidelink channel based on the first UE 115 and the second UE 115 each measuring respective SINRs of the subband 415-*a* and 415-*b* that satisfy the first threshold SINR. The first UE 115 and the second UE 115 may communicate reference signals over the first subset of subbands 415 and may generate a first portion 420-*a* of the encryption key 425 based on measurements of the communicated reference signals. The first UE 115 and the second UE 115 may then verify that the first portion 420-*a* generated at the first UE 115 and the second UE 115 is the same (e.g., by generating and communicating one-way digital signatures y).

After generating and verifying the first portion 420-*a* of the encryption key 425, the first UE 115 and the second UE 115 may generate a second portion 420-*b* of the encryption key 425 based on a second subset of subbands 415 having SINRs that fail to satisfy (e.g., are less than, are less than or equal to) the first threshold SINR and satisfy (e.g., are greater than, greater than or equal to) a second threshold SINR that is less than the first threshold SINR. For example, the first UE 115 and the second UE 115 may select (e.g., after generating and verifying the first portion 420-*a*, after communicating the respective SINR measurements for each subband 415) a subband 415-*c*, a subband 415-*d*, and a subband 415-*e* of the sidelink channel based on the first UE 115 and the second UE 115 each measuring respective SINRs of the subbands 415-*c*, 415-*d*, and 415-*e* that fail to satisfy the first threshold SINR and satisfy the second threshold SINR. The first UE 115 and the second UE 115 may communicate reference signals over the second subset of subbands 415 and may generate the second portion 420-*b* of the encryption key 425 based on measurements of the communicated reference signals. The first UE 115 and the second UE 115 may then verify that the first portion 420-*b* generated at the first UE 115 and the second UE 115 is the same.

In some examples, the first UE 115 and the second UE 115 may continue to generate and verify portions 420 of the encryption key 425 using subsets of subbands 415 having progressively lower SINRs (e.g., using a third subset of subbands 415 having SINRs that fail to satisfy the second threshold SINR and satisfy a third threshold SINR that is less than the second threshold SINR). The first UE 115 and the second UE 115 may continue to generate and verify such portions 420 until each of the subbands 415 of the sidelink channel have been used to generate a portion 420 of the encryption key 425 or until remaining subbands 415 of the sidelink channel have SINRs that fail to satisfy (e.g., are less than, are less than or equal to) a minimum threshold SINR. For example, the first UE 115 and the second UE 115 may be configured to refrain from generating portions 420 corresponding to subbands 415 that have SINRs failing to satisfy the minimum threshold SINR. In the example of FIG. 4B, the first UE 115 and the second UE 115 may stop generating and verifying additional portions 420 of the encryption key 425 based on remaining subbands 415 (not shown) of the sidelink channel having SINRs that fail to satisfy the minimum threshold SINR or based on first portion 420-*a* and the second portion 420-*b* together corresponding to all of the subbands 415 of the sidelink channel.

The first UE 115 and the second UE 115 may be configured to combine (e.g., concatenate) the first portion 420-*a* and the second portion 420-*b* to generate the encryption key 425. As the first portion 420-*a* and the second portion 420-*b* were sequentially (e.g., previously) verified as being the same, the first UE 115 and the second UE 115 may determine that the encryption key 425 is shared at the first UE 115 and the second UE 115 and may communicate sidelink signaling using the encryption key 425.

FIG. 4C depicts a key generation diagram 400-c in which a first UE 115 and a second UE 115 may generate an encryption key 445 using a verified portion 435 of the encryption key 445. For example, the first UE 115 and the second UE 115 may communicate over a set of subbands 430 of a sidelink channel. The verified portion 435 of the encryption key 445 may correspond to an encryption key generated and verified using a subset of subbands 430 of the set of subbands 430. For example, the verified portion 435 may correspond to an encryption key generated and verified using a subband 430-a, a subband 430-b, a subband 430-c, and a subband 430-d. In some examples, the verified portion 435 may be generated and verified using the subset of subbands 430 as described with reference to FIG. 4A. In some other examples, the verified portion 435 may be sequentially generated and verified and a subband 430-e, a subband 430-f, and a subband 430-g may correspond to remaining subbands 430 of the set of subbands 430 having SINRs that fail to satisfy a minimum threshold SINR (e.g., as described with reference to FIG. 4B).

The first UE 115 and the second UE 115 may be configured to use the verified portion 435 to construct the encryption key 445 having a higher length than the verified portion 435. In some cases, the higher the length of an encryption key, the more secure the communications between the first UE 115 and the second UE 115 are. Accordingly, constructing the encryption key 445 using the verified portion 435 may increase a security of the communications between the first UE 115 and the second UE 115.

To construct the encryption key 445 using the verified portion 435, the first UE 115 may encrypt an unverified portion 440 of the encryption key 445 using the verified portion 435. For example, the unverified portion 440 may correspond to an encryption key generated using remaining subbands 430 of the sidelink channel that is unverified as being shared at the first UE 115 and the second UE 115. The first UE 115 may generate the unverified portion 440 corresponding to the remaining subbands 430 (e.g., the subband 430-e, 430-f, and 430-g) and may encrypt (e.g., encode) the unverified portion 440 using the verified portion 435. The first UE 115 may transmit a sidelink message (e.g., a key message 235) to the second UE 115 that includes the encrypted unverified portion 440. Because the verified portion 435 is shared at the first UE 115 and the second UE 115, the first UE may decrypt (e.g., decode) the unverified portion 440 to determine the unverified portion 440. Based on communicating the encrypted unverified portion 440, the first UE 115 and the second UE 115 may combine (e.g., concatenate) the verified portion 435 and the unverified portion 440 to generate the encryption key 445. In this way, the first UE 115 may securely communicate the unverified portion 440 to the second UE 115 so that a length of the encryption key used for communicating over the sidelink channel may be increased.

Figure 5:
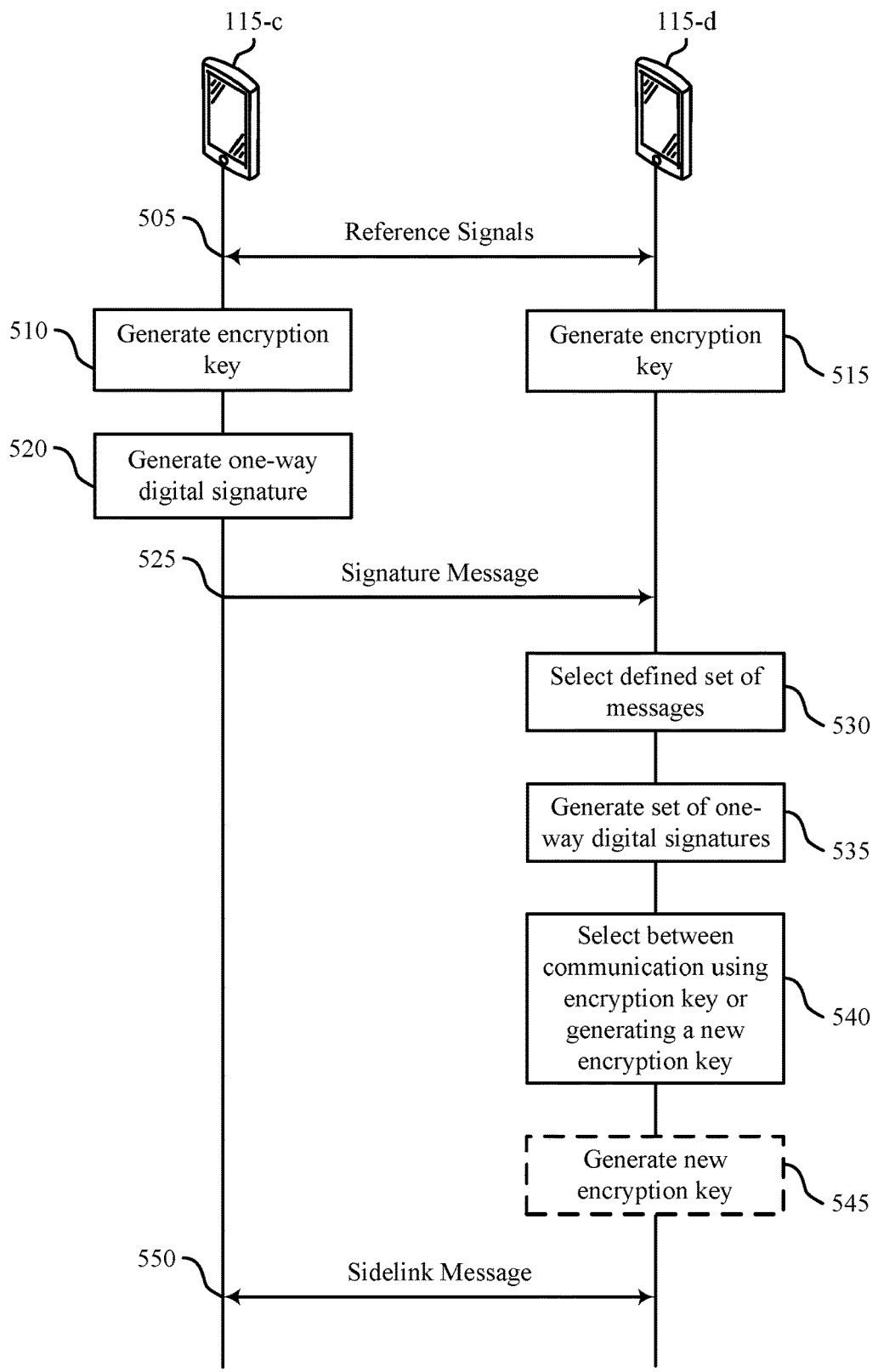
FIGS. 5 and 6 illustrate examples of process flows that support encryption key generation and verification techniques in accordance with aspects of the present disclosure.

FIG. 5 illustrates an example of a process flow 500 that supports encryption key generation and verification techniques in accordance with aspects of the present disclosure. The process flow 500 may implement or may be implemented by aspects of the wireless communications systems 100 and 200 as described with reference to FIGS. 1 and 2, respectively. For example, the process flow 500 may be implemented by a UE 115-c and a UE 115-d to support encryption key agreement between sidelink devices.

The UE 115-c and the UE 115-d may each be examples of a UE 115 as described herein, including with reference to FIGS. 1 through 4. In the following description of the process flow 500, the operations may be performed in different orders or at different times. Some operations also may be omitted from the process flow 500, and other operations may be added to the process flow 500. Further, although some operations or signaling may be shown to occur at different times for discussion purposes, these operations may actually occur at the same time.

At 505, the UE 115-c and the UE 115-d may communicate reference signals over one or more subbands of a sidelink channel that may be used for independent encryption key generation at the UE 115-c and the UE 115-d. In some examples, the UE 115-c and the UE 115-d may communicate the reference signals over a set of subbands of the sidelink channel mapped to by a seed provided by a base station 105 (not shown). In some example, the UE 115-c and the UE 115-d may communicate the reference signals over a subset of subbands of the sidelink channel (e.g., based on SINR measurements of the subbands, having indices previously exchanged by the UE 115-c and the UE 115-d).

At 510, the UE 115-c may generate an encryption key $K_1$ based on the communicated reference signals. For example, the UE 115-c may measure and quantize an amplitude or a phase of the reference signal communicated over each subband. The UE 115-c may combine the quantized amplitudes or phases to generate the encryption key $K_1$.

At 515, the UE 115-d may generate an encryption key $K_2$ based on the communicated reference signals. For example, the UE 115-d may measure and quantize an amplitude or a phase of the reference signal communicated over each subband. The UE 115-d may combine the quantized amplitudes or phases to generate the encryption key $K_2$.

At 520, the UE 115-c may generate a one-way digital signature $y_1$ based on the encryption key $K_1$. For example, the UE 115-c may select a defined set of messages from a set of multiple defined sets of messages that is associated with a length of the encryption key $K_1$. That is, the UE 115-c may select the defined set of messages based on messages included in the defined set of messages having a same length as the length of the encryption key $K_1$. The UE 115-c may select (e.g., randomly) a first message from the defined set of messages and may input the first message and the encryption key $K_1$ into a one-way mapping function that outputs the one-way digital signature $y_1$.

At 525, the UE 115-c may transmit a signature message over the sidelink channel to the UE 115-d that includes the one-way digital signature $y_1$. The signature message may be unencrypted so that the UE 115-d may be able to decode the signature message and determine the one-way digital signature $y_1$.

At 530, the UE 115-d may select the defined set of messages from the set of multiple defined sets of messages based on the length of the encryption key $K_2$. For example, the UE 115-d may select the defined set of messages based on the messages included in the defined set of messages having a same length as the length of encryption key $K_2$.

At 535, the UE 115-d may generate a set of one-way digital signatures y based on the encryption key $K_2$ to verify whether the encryption keys $K_1$ and $K_2$ are the same. For example, for each message of the defined set of messages, the UE 115-d may input the message and the encryption key $K_2$ into the one-way mapping function to generate a corresponding one-way digital signature y.

At 540, the UE 115-d many select between communicating with the UE 115-c using the encryption key $K_2$ or generating a new encryption key K. For example, the UE 115-d may compare the set one-way digital signatures y to the one-way digital signature $y_1$. If there is a match, the UE 115-d may determine that the encryption keys $K_1$ and $K_2$ are the same and may select to communicate with the UE 115-c using the encryption key $K_2$. If none of the one-way digital signatures y of the set match the one-way digital signature $y_1$, the UE 115-d may determine that the encryption keys $K_1$ and $K_2$ are different and may select to generate a new encryption key.

At 545, the UE 115-d may generate the new encryption key K, for example, if at 540, the UE 115-d determined that none of the one-way digital signatures of the set match the one-way digital signature $y_1$. In some examples, the UE 115-d may generate the new encryption key K using a subset of subbands of the sidelink channel.

At 550, the UE 115-d and the UE 115-c may communicate a sidelink message using a verified encryption key K. For example, if at 540, the UE 115-d determines that the encryption keys $K_1$ and $K_2$ are the same, the UE 115-d and the UE 115-c may communicate the sidelink message using the encryption keys $K_1$ and $K_2$. Alternatively, the UE 115-c and the UE 115-d may communicate the sidelink message using the new encryption key K based on verifying the new encryption key K.

Figure 6:
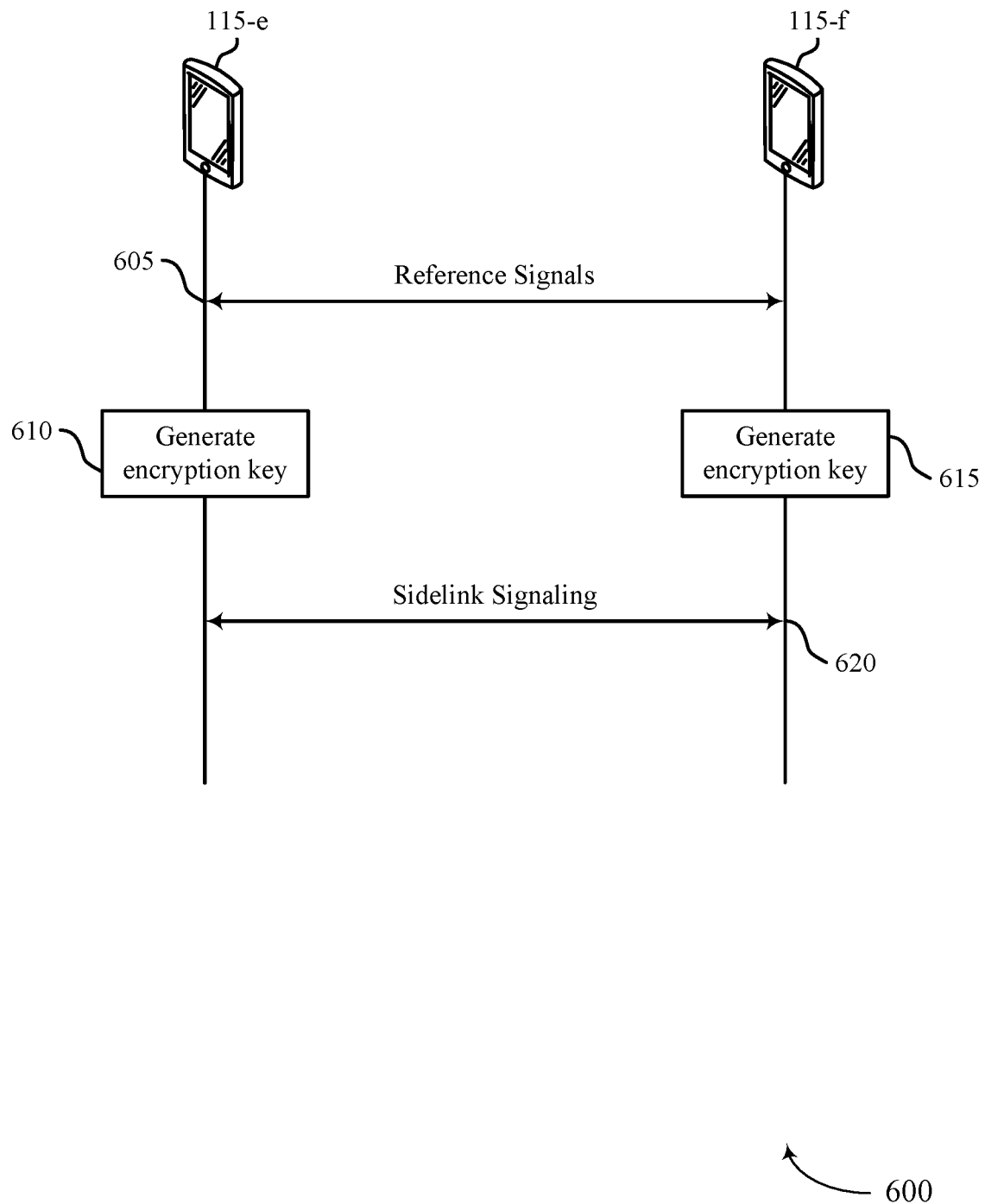

FIG. 6 illustrates an example of a process flow 600 that supports encryption key generation and verification techniques in accordance with aspects of the present disclosure. The process flow 600 may implement or may be implemented by aspects of the wireless communications systems 100 and 200 as described with reference to FIGS. 1 and 2, respectively. For example, the process flow 600 may be implemented by a UE 115-e and a UE 115-f to support encryption key generation between sidelink devices. In some examples, the process flow 600 may be implemented by the UE 115-c and the UE 115-d to generate an encryption key.

The UE 115-e and the UE 115-f may each be examples of a UE 115 as described herein, including with reference to FIGS. 1 through 5. In the following description of the process flow 600, the operations may be performed in different orders or at different times. Some operations also may be omitted from the process flow 600, and other operations may be added to the process flow 600. Further, although some operations or signaling may be shown to occur at different times for discussion purposes, these operations may actually occur at the same time.

At 605, the UE 115-e and the UE 115-f may communicate reference signals over a set of subbands of a sidelink channel. The UE 115-e and the UE 115-f may communicate the reference signals using multiple antennas. In some examples, the number of antennas used to communicate the reference signals and the subbands over which to communicate the reference signals may be indicated by a seed (e.g., a seed R) provided by a base station 105 (not shown).

At 610, the UE 115-e may generate an encryption key based on a set of communication parameters associated with communicating the reference signals using the multiple antennas. For example, based on communicating using multiple antennas, a rank, an eigen value distribution, a conditional value, a PMI, or a combination thereof, may be associated with each subband of the set of subbands. The UE 115-e may be configured to generate the encryption key corresponding to a combination of the ranks associated with each subband, a combination of the eigen value distributions associated with each subband, a combination of the conditional values associated with each subband, or a combination of the PMIs associated with each subband.

At 615, the UE 115-f may generate the encryption key based on the set of communication parameters. For example, the UE 115-f may be configured to generate the encryption key corresponding to a combination of the ranks associated with each subband, a combination of the eigen value distributions associated with each subband, a combination of the conditional values associated with each subband, or a combination of the PMIs associated with each subband.

At 620, the UE 115-e and the UE 115-f may communicate sidelink signaling using the encryption key.

Figure 7:
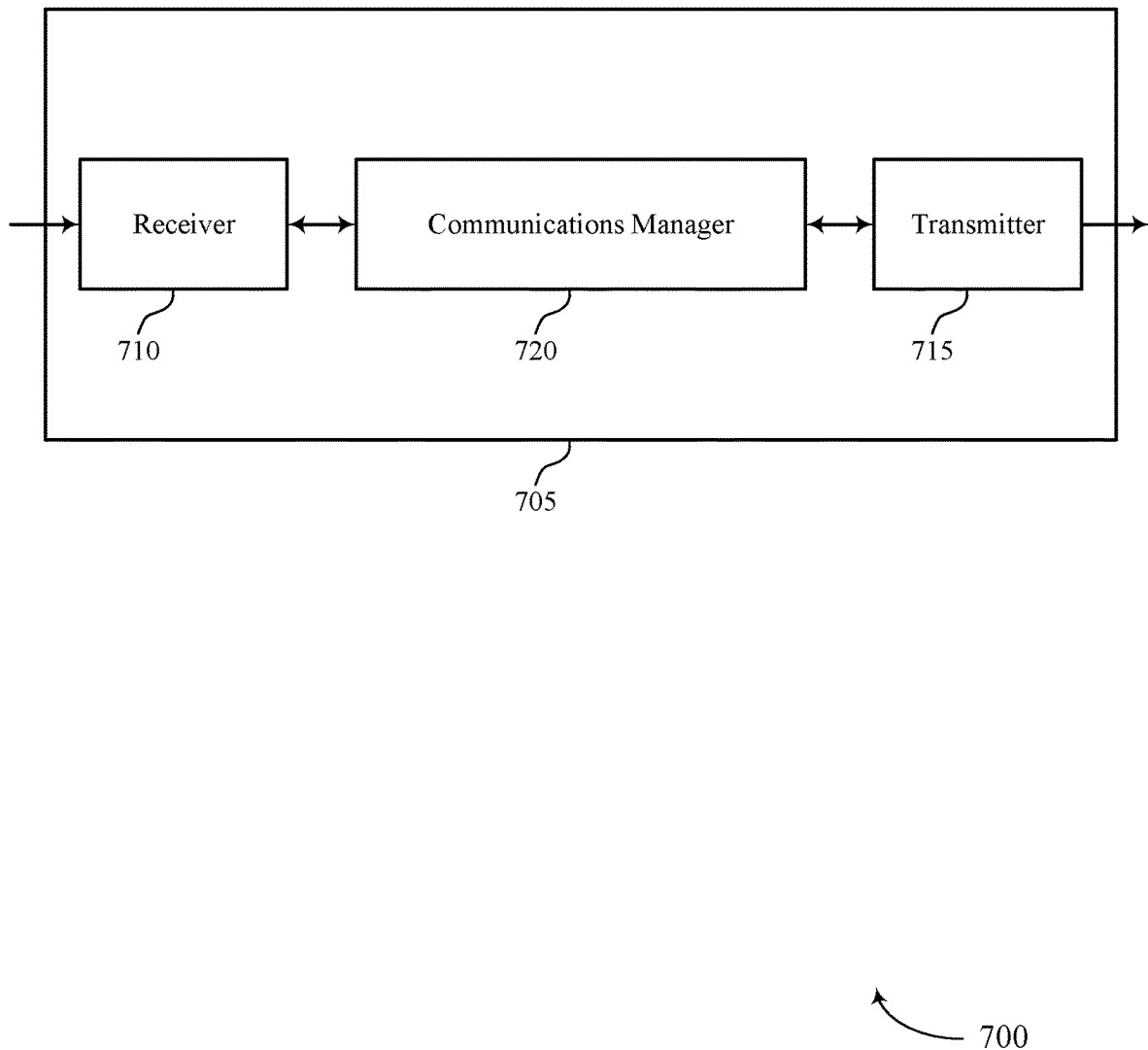
FIGS. 7 and 8 show block diagrams of devices that support encryption key generation and verification techniques in accordance with aspects of the present disclosure.

FIG. 7 shows a block diagram 700 of a device 705 that supports encryption key generation and verification techniques in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to encryption key generation and verification techniques). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to encryption key generation and verification techniques). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of encryption key generation and verification techniques as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first UE in accordance with examples as disclosed herein. For example, the communications manager 720 may be configured as or otherwise support a means for generating a first encryption key at the first UE based on a measurement of a channel between the first UE and a second UE. The communications manager 720 may be configured as or otherwise support a means for receiving, from the second UE, a sidelink message including a first one-way digital signature, where the first one-way digital signature is based on a first message from a defined set of messages and a second encryption key at the second UE. The communications manager 720 may be configured as or otherwise support a means for generating a set of one-way digital signatures at the first UE using the first encryption key, where each one-way digital signature of the set of one-way digital signatures corresponds to a separate message of the defined set of messages. The communications manager 720 may be configured as or otherwise support a means for selecting between using the first encryption key to communicate with the second UE and generating a new encryption key to communicate with the second UE, where the selecting is based on a comparison between the first one-way digital signature received from the second UE and a second one-way digital signature in the set of one-way digital signatures generated at the first UE.

Additionally or alternatively, the communications manager 720 may support wireless communication in accordance with examples as disclosed herein. For example, the communications manager 720 may be configured as or otherwise support a means for generating, based on a measurement of a channel between a first UE and a second UE, an encryption key at the second UE. The communications manager 720 may be configured as or otherwise support a means for generating, at the second UE, a first one-way digital signature based on a first message from a defined set of messages and the encryption key. The communications manager 720 may be configured as or otherwise support a means for transmitting, by the second UE to the first UE, a sidelink message including the first one-way digital signature to enable verification of whether the encryption key is shared at the first UE and the second UE.

Additionally or alternatively, the communications manager 720 may support wireless communication at a first UE in accordance with examples as disclosed herein. For example, the communications manager 720 may be configured as or otherwise support a means for communicating, with a second UE and using a set of multiple antennas, a set of reference signals over a set of subbands. The communications manager 720 may be configured as or otherwise support a means for generating an encryption key at the first UE based on a set of communication parameters associated with using the set of multiple antennas to communicate the set of reference signals over the set of subbands. The communications manager 720 may be configured as or otherwise support a means for communicating sidelink signaling with the second UE in accordance with the encryption key.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced processing and more efficient utilization of communication resources, for example, by supporting secure encryption key generation and verification for sidelink communications, which may increase communication security and prevent eavesdropping devices from negatively affecting the sidelink communications.

Figure 8:
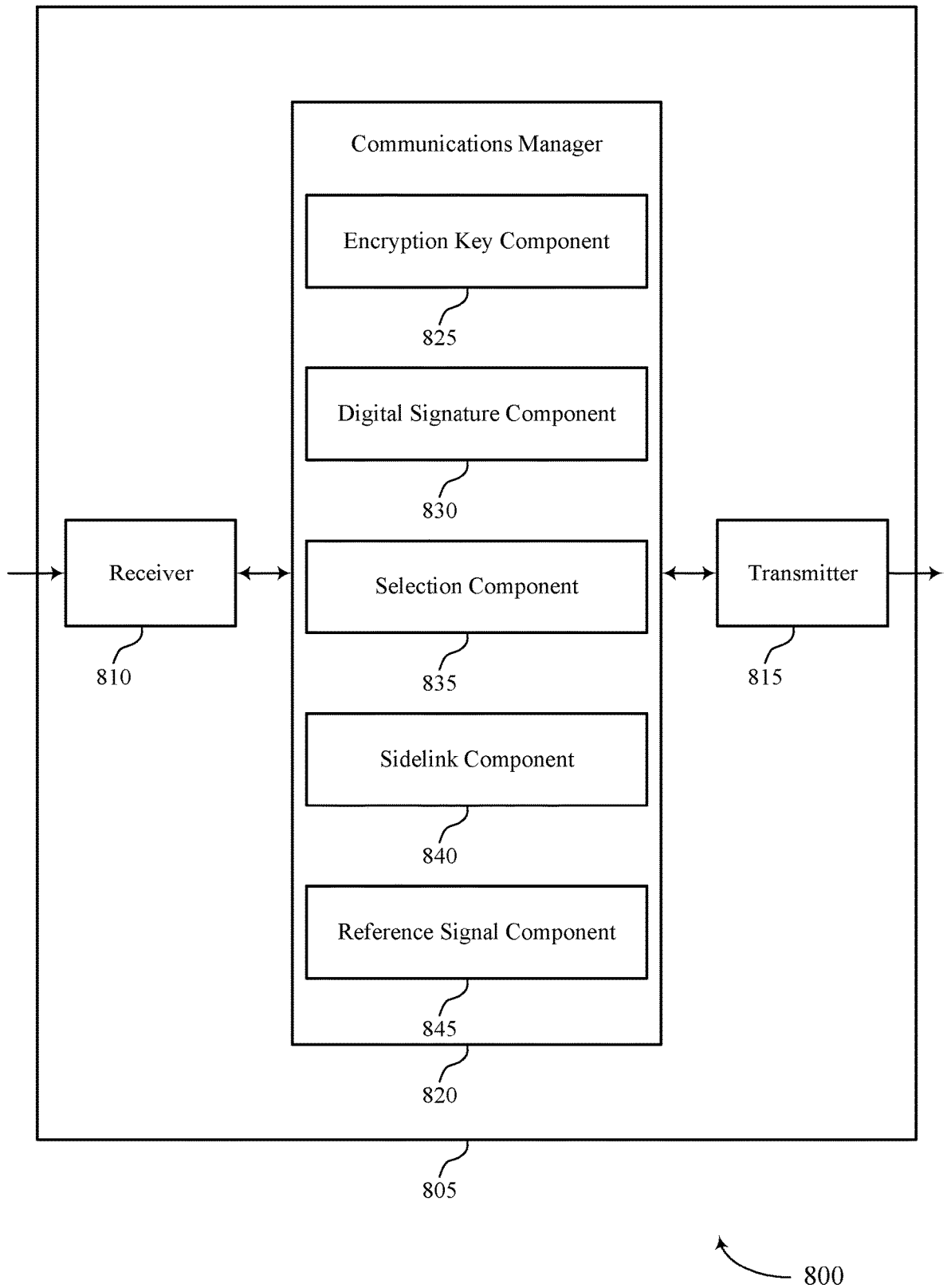

FIG. 8 shows a block diagram 800 of a device 805 that supports encryption key generation and verification techniques in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to encryption key generation and verification techniques). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to encryption key generation and verification techniques). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of encryption key generation and verification techniques as described herein. For example, the communications manager 820 may include an encryption key component 825, a digital signature component 830, a selection component 835, a sidelink component 840, a reference signal component 845, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a first UE in accordance with examples as disclosed herein. The encryption key component 825 may be configured as or otherwise support a means for generating a first encryption key at the first UE based on a measurement of a channel between the first UE and a second UE. The digital signature component 830 may be configured as or otherwise support a means for receiving, from the second UE, a sidelink message including a first one-way digital signature, where the first one-way digital signature is based on a first message from a defined set of messages and a second encryption key at the second UE. The digital signature component 830 may be configured as or otherwise support a means for generating a set of one-way digital signatures at the first UE using the first encryption key, where each one-way digital signature of the set of one-way digital signatures corresponds to a separate message of the defined set of messages. The selection component 835 may be configured as or otherwise support a means for selecting between using the first encryption key to communicate with the second UE and generating a new encryption key to communicate with the second UE, where the selecting is based on a comparison between the first one-way digital signature received from the second UE and a second one-way digital signature in the set of one-way digital signatures generated at the first UE.

Additionally or alternatively, the communications manager 820 may support wireless communication in accordance with examples as disclosed herein. The encryption key component 825 may be configured as or otherwise support a means for generating, based on a measurement of a channel between a first UE and a second UE, an encryption key at the second UE. The digital signature component 830 may be configured as or otherwise support a means for generating, at the second UE, a first one-way digital signature based on a first message from a defined set of messages and the encryption key. The sidelink component 840 may be configured as or otherwise support a means for transmitting, by the second UE to the first UE, a sidelink message including the first one-way digital signature to enable verification of whether the encryption key is shared at the first UE and the second UE.

Additionally or alternatively, the communications manager 820 may support wireless communication at a first UE in accordance with examples as disclosed herein. The reference signal component 845 may be configured as or otherwise support a means for communicating, with a second UE and using a set of multiple antennas, a set of reference signals over a set of subbands. The encryption key component 825 may be configured as or otherwise support a means for generating an encryption key at the first UE based on a set of communication parameters associated with using the set of multiple antennas to communicate the set of reference signals over the set of subbands. The sidelink component 840 may be configured as or otherwise support a means for communicating sidelink signaling with the second UE in accordance with the encryption key.

Figure 9:
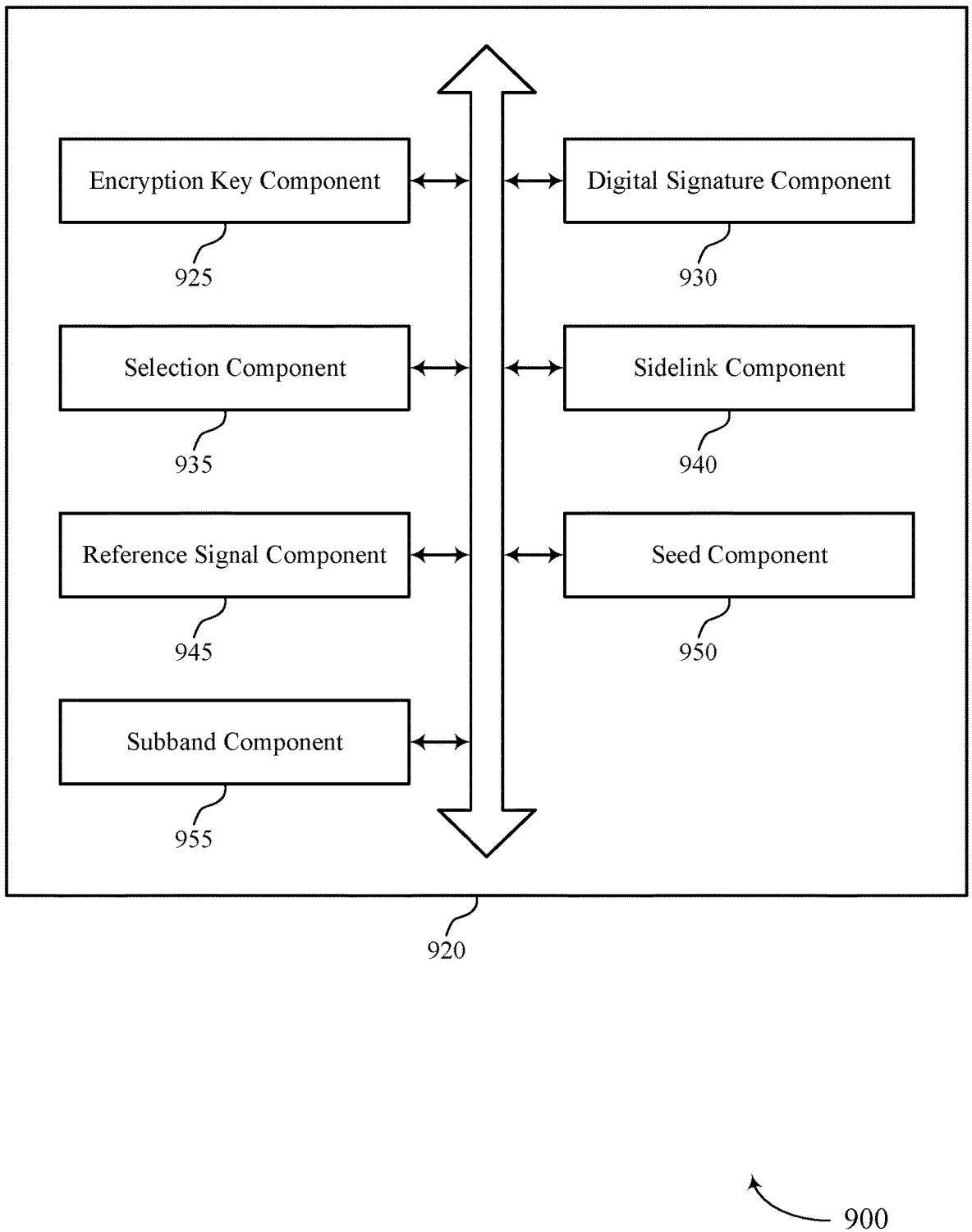
FIG. 9 shows a block diagram of a communications manager that supports encryption key generation and verification techniques in accordance with aspects of the present disclosure.

FIG. 9 shows a block diagram 900 of a communications manager 920 that supports encryption key generation and verification techniques in accordance with aspects of the present disclosure. The communications manager 920 may be an example of aspects of a communications manager 720, a communications manager 820, or both, as described herein. The communications manager 920, or various components thereof, may be an example of means for performing various aspects of encryption key generation and verification techniques as described herein. For example, the communications manager 920 may include an encryption key component 925, a digital signature component 930, a selection component 935, a sidelink component 940, a reference signal component 945, a seed component 950, a subband component 955, or any combination thereof. Each of these components may communicate, directly or indirectly, with one another (e.g., via one or more buses).

The communications manager 920 may support wireless communication at a first UE in accordance with examples as disclosed herein. The encryption key component 925 may be configured as or otherwise support a means for generating a first encryption key at the first UE based on a measurement of a channel between the first UE and a second UE. The digital signature component 930 may be configured as or otherwise support a means for receiving, from the second UE, a sidelink message including a first one-way digital signature, where the first one-way digital signature is based on a first message from a defined set of messages and a second encryption key at the second UE. In some examples, the digital signature component 930 may be configured as or otherwise support a means for generating a set of one-way digital signatures at the first UE using the first encryption key, where each one-way digital signature of the set of one-way digital signatures corresponds to a separate message of the defined set of messages. The selection component 935 may be configured as or otherwise support a means for selecting between using the first encryption key to communicate with the second UE and generating a new encryption key to communicate with the second UE, where the selecting is based on a comparison between the first one-way digital signature received from the second UE and a second one-way digital signature in the set of one-way digital signatures generated at the first UE.

In some examples, the sidelink component 940 may be configured as or otherwise support a means for communicating, with the second UE, a second sidelink message using the first encryption key based on the comparison indicating a match between the first one-way digital signature and the second one-way digital signature.

In some examples, the digital signature component 930 may be configured as or otherwise support a means for selecting the defined set of messages for generating the set of one-way digital signatures from a set of multiple defined sets of messages based on a length of the first encryption key, where each defined set of messages of the plurality is associated with a different length, and where a length associated with the defined set of messages is the same as the length of the first encryption key.

In some examples, the encryption key component 925 may be configured as or otherwise support a means for generating the new encryption key based on the comparison and a second comparison between the first one-way digital signature and each remaining one-way digital signatures in the set of one-way digital signatures indicating a lack of a match between the first one-way digital signature and each of the one-way digital signatures in the set of one-way digital signatures.

In some examples, the new encryption key is generated based on a second measurement of a subset of subbands of the channel, each subband of the subset of subbands having a respective SINR that satisfies a threshold SINR.

In some examples, the subband component 955 may be configured as or otherwise support a means for communicating, with the second UE, a second sidelink message that indicates the subset of subbands associated with generating the new encryption key, where the new encryption key is generated based on the second sidelink message.

In some examples, to support generating the first encryption key, the encryption key component 925 may be configured as or otherwise support a means for generating a first portion of the first encryption key based on a first channel measurement of a first subset of subbands of the channel, each subband of the first subset of subbands having a respective SINR that satisfies a first threshold SINR. In some examples, to support generating the first encryption key, the encryption key component 925 may be configured as or otherwise support a means for generating, after generating the first portion of the first encryption key, a second portion of the first encryption key based on a second channel measurement of a second subset of subbands of the channel, each subband of the second subset of subbands having a respective SINR that fails to satisfy the first threshold SINR and satisfies a second threshold SINR. In some examples, to support generating the first encryption key, the encryption key component 925 may be configured as or otherwise support a means for combining the first portion of the first encryption key and the second portion of the first encryption key to form the first encryption key based on a third subset of subbands of the channel having SINRs that fail to satisfy a third threshold SINR.

In some examples, the first portion of the first encryption key and the second portion of the first encryption key are combined based on verifying that the first portion of the first encryption key is the same as a first portion of the second encryption key and verifying that the second portion of the first encryption key is the same as a second portion of the second encryption key.

In some examples, to support generating the first encryption key, the encryption key component 925 may be configured as or otherwise support a means for generating a first portion of the first encryption key based on a first measurement of a first subset of subbands of the channel, where the first portion of the first encryption key is verified as being the same as a first portion of the second encryption key. In some examples, to support generating the first encryption key, the encryption key component 925 may be configured as or otherwise support a means for receiving, from the second UE, a second sidelink message including a second portion of the second encryption key that is encoded using the first portion of the first encryption key. In some examples, to support generating the first encryption key, the encryption key component 925 may be configured as or otherwise support a means for combining the first portion of the first encryption key and the second portion of the second encryption key to form the first encryption key.

In some examples, a first length of the new encryption key is shorter than a second length of the first encryption key.

Additionally or alternatively, the communications manager 920 may support wireless communication in accordance with examples as disclosed herein. In some examples, the encryption key component 925 may be configured as or otherwise support a means for generating, based on a measurement of a channel between a first UE and a second UE, an encryption key at the second UE. In some examples, the digital signature component 930 may be configured as or otherwise support a means for generating, at the second UE, a first one-way digital signature based on a first message from a defined set of messages and the encryption key. The sidelink component 940 may be configured as or otherwise support a means for transmitting, by the second UE to the first UE, a sidelink message including the first one-way digital signature to enable verification of whether the encryption key is shared at the first UE and the second UE.

In some examples, the sidelink component 940 may be configured as or otherwise support a means for communicating, between the first UE and the second UE, a second sidelink message using the encryption key based on verifying that the encryption key is shared at the first UE and the second UE.

In some examples, the digital signature component 930 may be configured as or otherwise support a means for selecting, at the second UE, the defined set of messages from a set of multiple defined sets of messages based on a length of the encryption key, where each defined set of messages of the plurality is associated with a different length, and where a length associated with the defined set of messages is the same as the length of the encryption key.

In some examples, the first message is randomly selected from the defined set of messages.

In some examples, the encryption key component 925 may be configured as or otherwise support a means for generating, at the second UE, a second encryption key based on failing to verify that the encryption key is shared at the first UE and the second UE. In some examples, the digital signature component 930 may be configured as or otherwise support a means for generating, at the second UE, a second one-way digital signature based on a second message from a second defined set of messages and the second encryption key. In some examples, the sidelink component 940 may be configured as or otherwise support a means for transmitting, by the second UE to the first UE, a second sidelink message including the second one-way digital signature to enable verification of whether the second encryption key is shared at the first UE and the second UE.

In some examples, the second encryption key is generated based on a second measurement of a subset of subbands of the channel, each subband of the subset of subbands having a respective SINR that satisfies a threshold SINR.

In some examples, the subband component 955 may be configured as or otherwise support a means for communicating, between the first UE and the second UE, a third sidelink message that indicates the subset of subbands associated with generating the second encryption key, where the second encryption key is generated based on the third sidelink message.

In some examples, a first length of encryption key is longer than a second length of the second encryption key.

In some examples, to support generating the encryption key at the second UE, the encryption key component 925 may be configured as or otherwise support a means for generating a first portion of the encryption key based on a first channel measurement of a first subset of subbands of the channel, each subband of the first subset of subbands having a respective SINR that satisfies a first threshold SINR. In some examples, to support generating the encryption key at the second UE, the encryption key component 925 may be configured as or otherwise support a means for generating, after verifying that the first portion of the encryption key is shared at the first UE and the second UE, a second portion of the encryption key based on a second channel measurement of a second subset of subbands of the channel, each subband of the second subset of subbands having a respective SINR that fails to satisfy the first threshold SINR and satisfies a second threshold SINR. In some examples, to support generating the encryption key at the second UE, the encryption key component 925 may be configured as or otherwise support a means for combining, the first portion of the encryption key and the second portion of the encryption key to form the encryption key based on a third subset of subbands of the channel having SINRs that fail to satisfy a third threshold SINR.

In some examples, to support generating the encryption key at the second UE, the encryption key component 925 may be configured as or otherwise support a means for generating a first portion of the encryption key based on a first measurement of a first subset of subbands of the channel, where the first portion of the encryption key is verified as being shared at the first UE and the second UE. In some examples, to support generating the encryption key at the second UE, the encryption key component 925 may be configured as or otherwise support a means for generating a second portion of the encryption key, where the second portion of the encryption key fails to be verified as being shared at the first UE and the second UE. In some examples, the sidelink component 940 may be configured as or otherwise support a means for transmitting, from the second UE to the first UE, a second sidelink message including the second portion of the encryption key that is encoded using the first portion of the encryption key based on the second portion of the encryption key failing to be verified, where the encryption key corresponds to a combination of the first portion of the encryption key and the second portion of the encryption key based on transmitting the second sidelink message.

Additionally or alternatively, the communications manager 920 may support wireless communication at a first UE in accordance with examples as disclosed herein. The reference signal component 945 may be configured as or otherwise support a means for communicating, with a second UE and using a set of multiple antennas, a set of reference signals over a set of subbands. In some examples, the encryption key component 925 may be configured as or otherwise support a means for generating an encryption key at the first UE based on a set of communication parameters associated with using the set of multiple antennas to communicate the set of reference signals over the set of subbands. In some examples, the sidelink component 940 may be configured as or otherwise support a means for communicating sidelink signaling with the second UE in accordance with the encryption key.

In some examples, the set of communication parameters includes a rank associated with each subband of the set of subbands, the encryption key corresponding to a combination of the ranks associated with each subband.

In some examples, the set of communication parameters includes an eigen value distribution associated with each subband of the set of subbands, the encryption key corresponding to a combination of eigen value distributions associated with each subband.

In some examples, the set of communication parameters includes a conditional value associated with each subband of the set of subbands, each conditional value being a ratio of a maximum eigen value of a respective subband to a minimum eigen value of the respective subband. In some examples, the encryption key corresponds to a combination of the conditional values associated with each subband.

In some examples, the set of communication parameters includes a PMI associated with each subband of the set of subbands, the encryption key corresponding to a combination of the PMIs associated with each subband.

In some examples, the seed component 950 may be configured as or otherwise support a means for receiving, from a network entity, a message including a seed that indicates the set of multiple antennas to use to communicate with the second UE and the set of subbands over which to communicate with the second UE.

Figure 10:
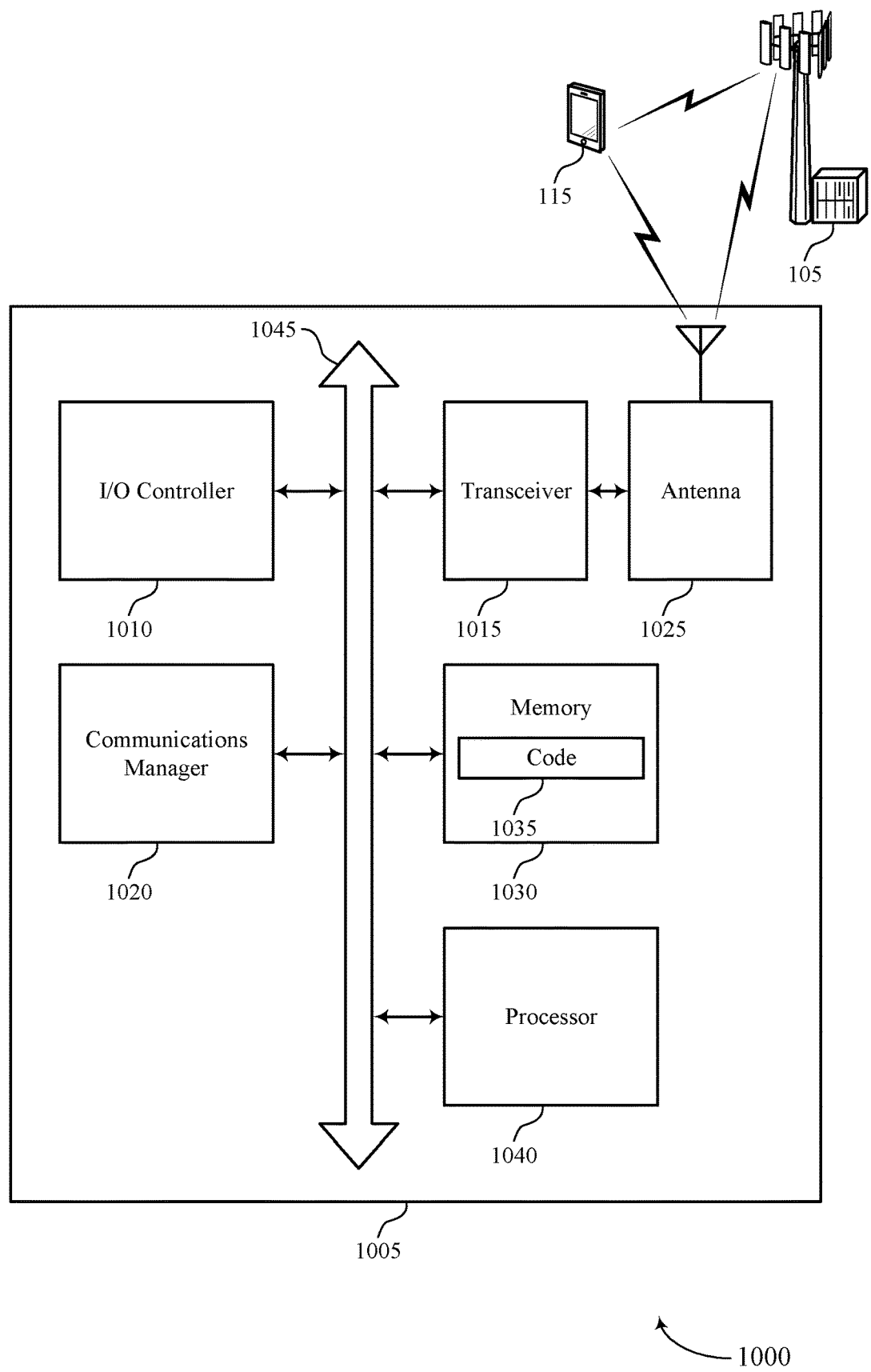
FIG. 10 shows a diagram of a system including a device that supports encryption key generation and verification techniques in accordance with aspects of the present disclosure.

FIG. 10 shows a diagram of a system 1000 including a device 1005 that supports encryption key generation and verification techniques in accordance with aspects of the present disclosure. The device 1005 may be an example of or include the components of a device 705, a device 805, or a UE 115 as described herein. The device 1005 may communicate wirelessly with one or more network devices (e.g., base stations 105), UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting encryption key generation and verification techniques). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication at a first UE in accordance with examples as disclosed herein. For example, the communications manager 1020 may be configured as or otherwise support a means for generating a first encryption key at the first UE based on a measurement of a channel between the first UE and a second UE. The communications manager 1020 may be configured as or otherwise support a means for receiving, from the second UE, a sidelink message including a first one-way digital signature, where the first one-way digital signature is based on a first message from a defined set of messages and a second encryption key at the second UE. The communications manager 1020 may be configured as or otherwise support a means for generating a set of one-way digital signatures at the first UE using the first encryption key, where each one-way digital signature of the set of one-way digital signatures corresponds to a separate message of the defined set of messages. The communications manager 1020 may be configured as or otherwise support a means for selecting between using the first encryption key to communicate with the second UE and generating a new encryption key to communicate with the second UE, where the selecting is based on a comparison between the first one-way digital signature received from the second UE and a second one-way digital signature in the set of one-way digital signatures generated at the first UE.

Additionally or alternatively, the communications manager 1020 may support wireless communication in accordance with examples as disclosed herein. For example, the communications manager 1020 may be configured as or otherwise support a means for generating, based on a measurement of a channel between a first UE and a second UE, an encryption key at the second UE. The communications manager 1020 may be configured as or otherwise support a means for generating, at the second UE, a first one-way digital signature based on a first message from a defined set of messages and the encryption key. The communications manager 1020 may be configured as or otherwise support a means for transmitting, by the second UE to the first UE, a sidelink message including the first one-way digital signature to enable verification of whether the encryption key is shared at the first UE and the second UE.

Additionally or alternatively, the communications manager 1020 may support wireless communication at a first UE in accordance with examples as disclosed herein. For example, the communications manager 1020 may be configured as or otherwise support a means for communicating, with a second UE and using a set of multiple antennas, a set of reference signals over a set of subbands. The communications manager 1020 may be configured as or otherwise support a means for generating an encryption key at the first UE based on a set of communication parameters associated with using the set of multiple antennas to communicate the set of reference signals over the set of subbands. The communications manager 1020 may be configured as or otherwise support a means for communicating sidelink signaling with the second UE in accordance with the encryption key.

By including or configuring the communications manager 1020 in accordance with examples as described herein, the device 1005 may support techniques for increased communication security, eavesdropping prevention, encryption key agreement between sidelink devices, more efficient utilization of communication resources, and improved coordination between devices, among other benefits.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of encryption key generation and verification techniques as described herein, or the processor 1040 and the memory 1030 may be otherwise configured to perform or support such operations.

Figure 11:
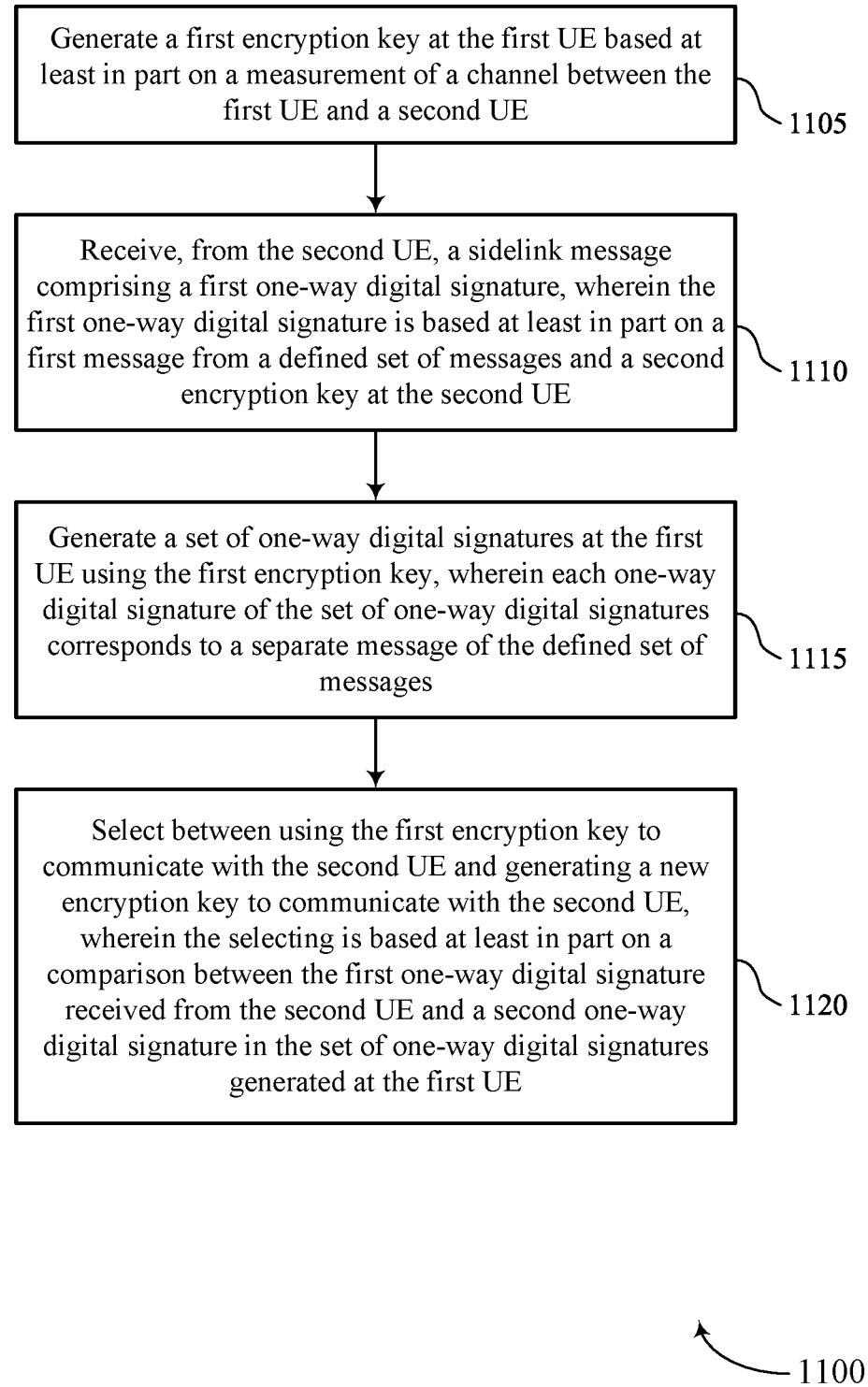
FIGS. 11 through 18 show flowcharts illustrating methods that support encryption key generation and verification techniques in accordance with aspects of the present disclosure.

FIG. 11 shows a flowchart illustrating a method 1100 that supports encryption key generation and verification techniques in accordance with aspects of the present disclosure. The operations of the method 1100 may be implemented by a first UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1105, the method may include generating a first encryption key at the first UE based at least in part on a measurement of a channel between the first UE and a second UE. The operations of 1105 may be performed in accordance with examples as disclosed herein. In some examples, aspects of the operations of 1105 may be performed by an encryption key component 925 as described with reference to FIG. 9.

At 1110, the method may include receiving, from the second UE, a sidelink message comprising a first one-way digital signature, wherein the first one-way digital signature is based at least in part on a first message from a defined set of messages and a second encryption key at the second UE. The operations of 1110 may be performed in accordance with examples as disclosed herein. In some examples, aspects of the operations of 1110 may be performed by a digital signature component 930 as described with reference to FIG. 9.

At 1115, the method may include generating a set of one-way digital signatures at the first UE using the first encryption key, wherein each one-way digital signature of the set of one-way digital signatures corresponds to a separate message of the defined set of messages. The operations of 1115 may be performed in accordance with examples as disclosed herein. In some examples, aspects of the operations of 1115 may be performed by a digital signature component 930 as described with reference to FIG. 9.

At 1120, the method may include selecting between using the first encryption key to communicate with the second UE and generating a new encryption key to communicate with the second UE, wherein the selecting is based at least in part on a comparison between the first one-way digital signature received from the second UE and a second one-way digital signature in the set of one-way digital signatures generated at the first UE. The operations of 1120 may be performed in accordance with examples as disclosed herein. In some examples, aspects of the operations of 1120 may be performed by a selection component 935 as described with reference to FIG. 9.

Figure 12:
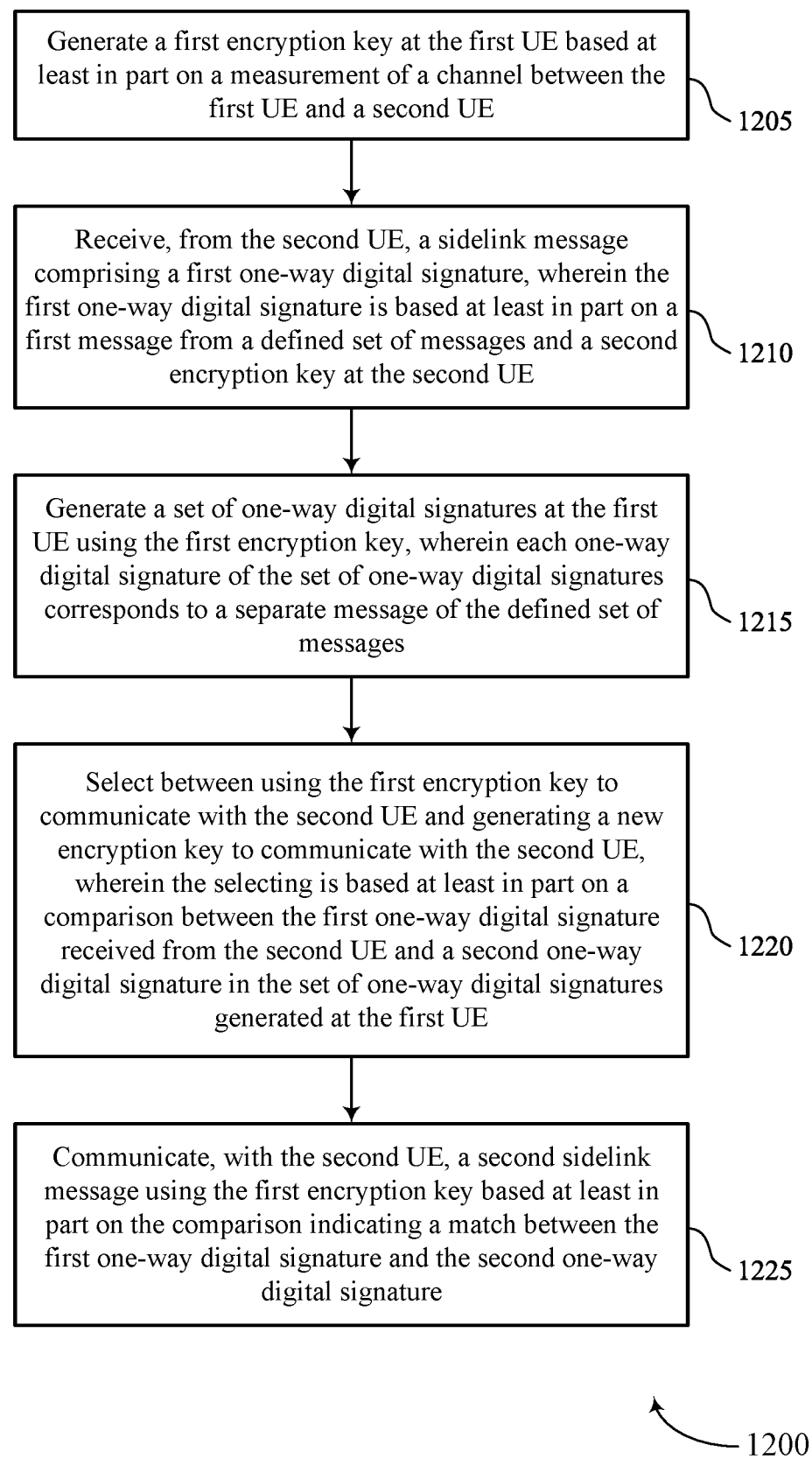

FIG. 12 shows a flowchart illustrating a method 1200 that supports encryption key generation and verification techniques in accordance with aspects of the present disclosure. The operations of the method 1200 may be implemented by a first UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1205, the method may include generating a first encryption key at the first UE based at least in part on a measurement of a channel between the first UE and a second UE. The operations of 1205 may be performed in accordance with examples as disclosed herein. In some examples, aspects of the operations of 1205 may be performed by an encryption key component 925 as described with reference to FIG. 9.

At 1210, the method may include receiving, from the second UE, a sidelink message comprising a first one-way digital signature, wherein the first one-way digital signature is based at least in part on a first message from a defined set of messages and a second encryption key at the second UE. The operations of 1210 may be performed in accordance with examples as disclosed herein. In some examples, aspects of the operations of 1210 may be performed by a digital signature component 930 as described with reference to FIG. 9.

At 1215, the method may include generating a set of one-way digital signatures at the first UE using the first encryption key, wherein each one-way digital signature of the set of one-way digital signatures corresponds to a separate message of the defined set of messages. The operations of 1215 may be performed in accordance with examples as disclosed herein. In some examples, aspects of the operations of 1215 may be performed by a digital signature component 930 as described with reference to FIG. 9.

At 1220, the method may include selecting between using the first encryption key to communicate with the second UE and generating a new encryption key to communicate with the second UE, wherein the selecting is based at least in part on a comparison between the first one-way digital signature received from the second UE and a second one-way digital signature in the set of one-way digital signatures generated at the first UE. The operations of 1220 may be performed in accordance with examples as disclosed herein. In some examples, aspects of the operations of 1220 may be performed by a selection component 935 as described with reference to FIG. 9.

At 1225, the method may include communicating, with the second UE, a second sidelink message using the first encryption key based at least in part on the comparison indicating a match between the first one-way digital signature and the second one-way digital signature. The operations of 1225 may be performed in accordance with examples as disclosed herein. In some examples, aspects of the operations of 1225 may be performed by a sidelink component 940 as described with reference to FIG. 9.

Figure 13:
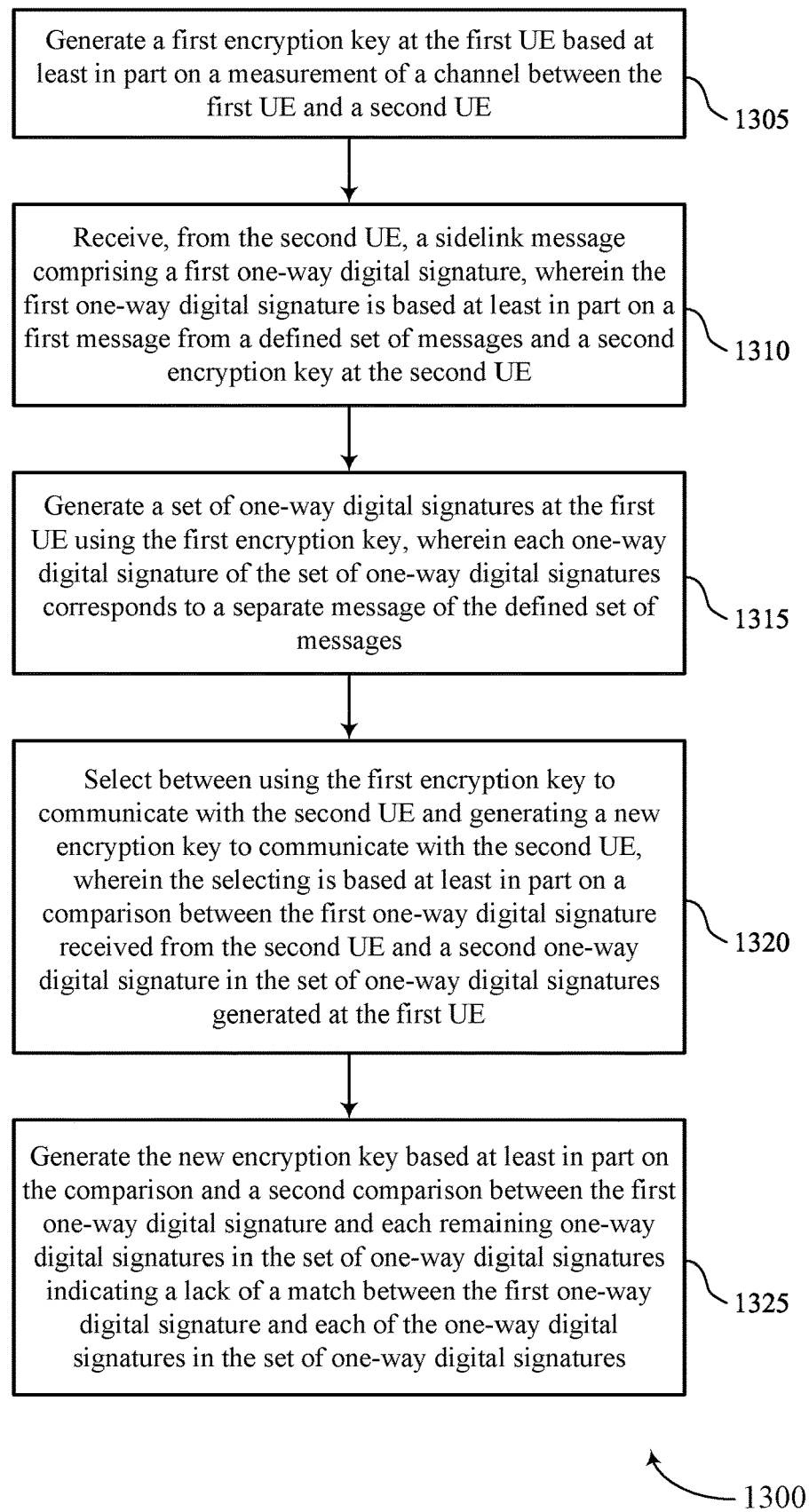

FIG. 13 shows a flowchart illustrating a method 1300 that supports encryption key generation and verification techniques in accordance with aspects of the present disclosure. The operations of the method 1300 may be implemented by a first UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1305, the method may include generating a first encryption key at the first UE based at least in part on a measurement of a channel between the first UE and a second UE. The operations of 1305 may be performed in accordance with examples as disclosed herein. In some examples, aspects of the operations of 1305 may be performed by an encryption key component 925 as described with reference to FIG. 9.

At 1310, the method may include receiving, from the second UE, a sidelink message including a first one-way digital signature, where the first one-way digital signature is based on a first message from a defined set of messages and a second encryption key at the second UE. The operations of 1310 may be performed in accordance with examples as disclosed herein. In some examples, aspects of the operations of 1310 may be performed by a digital signature component 930 as described with reference to FIG. 9.

At 1315, the method may include generating a set of one-way digital signatures at the first UE using the first encryption key, where each one-way digital signature of the set of one-way digital signatures corresponds to a separate message of the defined set of messages. The operations of 1315 may be performed in accordance with examples as disclosed herein. In some examples, aspects of the operations of 1315 may be performed by a digital signature component 930 as described with reference to FIG. 9.

At 1320, the method may include selecting between using the first encryption key to communicate with the second UE and generating a new encryption key to communicate with the second UE, where the selecting is based on a comparison between the first one-way digital signature received from the second UE and a second one-way digital signature in the set of one-way digital signatures generated at the first UE. The operations of 1320 may be performed in accordance with examples as disclosed herein. In some examples, aspects of the operations of 1320 may be performed by a selection component 935 as described with reference to FIG. 9.

At 1325, the method may include generating the new encryption key based on the comparison and a second comparison between the first one-way digital signature and each remaining one-way digital signatures in the set of one-way digital signatures indicating a lack of a match between the first one-way digital signature and each of the one-way digital signatures in the set of one-way digital signatures. The operations of 1325 may be performed in accordance with examples as disclosed herein. In some examples, aspects of the operations of 1325 may be performed by an encryption key component 925 as described with reference to FIG. 9.

Figure 14:
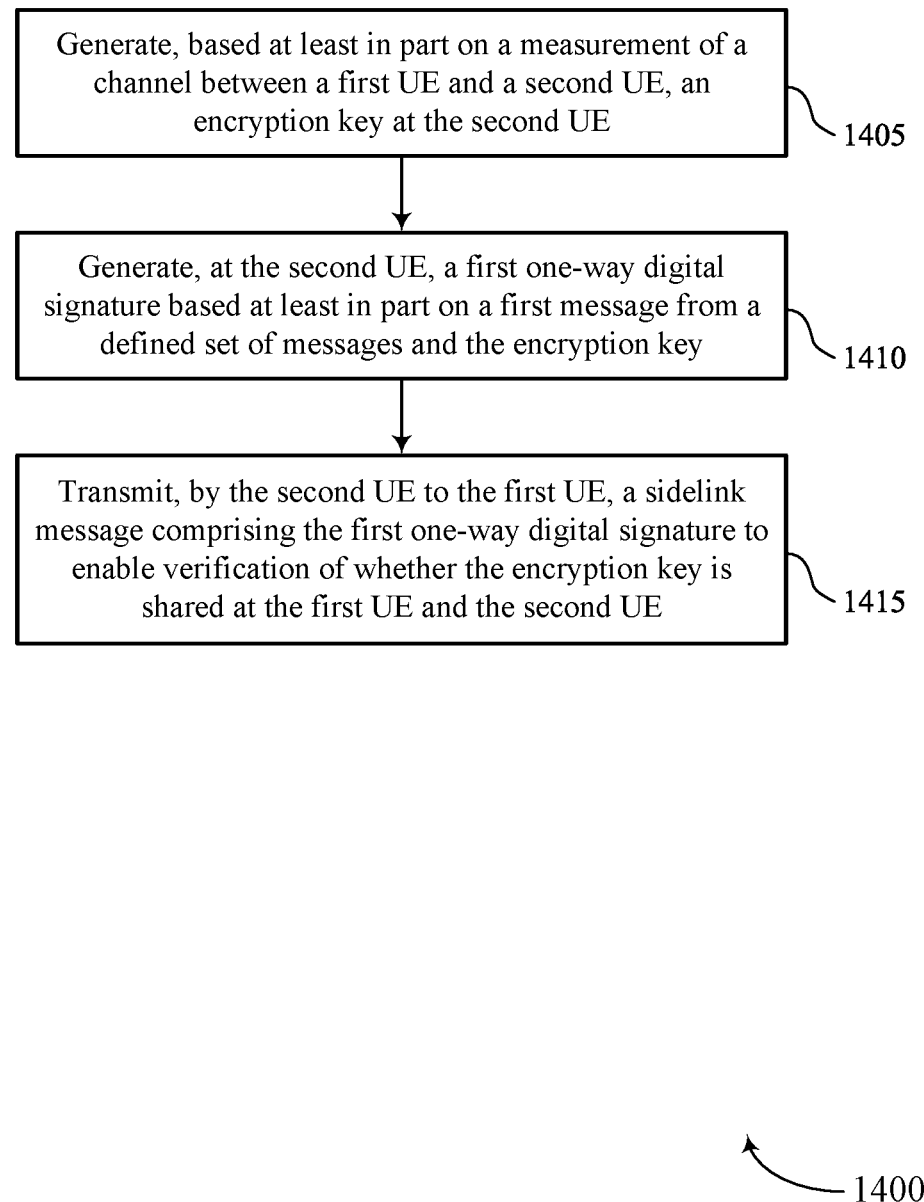

FIG. 14 shows a flowchart illustrating a method 1400 that supports encryption key generation and verification techniques in accordance with aspects of the present disclosure. The operations of the method 1400 may be implemented by a UE or its components as described herein. For example, the operations of the method 1400 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1405, the method may include generating, based at least in part on a measurement of a channel between a first UE and a second UE, an encryption key at the second UE. The operations of 1405 may be performed in accordance with examples as disclosed herein. In some examples, aspects of the operations of 1405 may be performed by an encryption key component 925 as described with reference to FIG. 9.

At 1410, the method may include generating, at the second UE, a first one-way digital signature based at least in part on a first message from a defined set of messages and the encryption key. The operations of 1410 may be performed in accordance with examples as disclosed herein. In some examples, aspects of the operations of 1410 may be performed by a digital signature component 930 as described with reference to FIG. 9.

At 1415, the method may include transmitting, by the second UE to the first UE, a sidelink message comprising the first one-way digital signature to enable verification of whether the encryption key is shared at the first UE and the second UE. The operations of 1415 may be performed in accordance with examples as disclosed herein. In some examples, aspects of the operations of 1415 may be performed by a sidelink component 940 as described with reference to FIG. 9.

Figure 15:
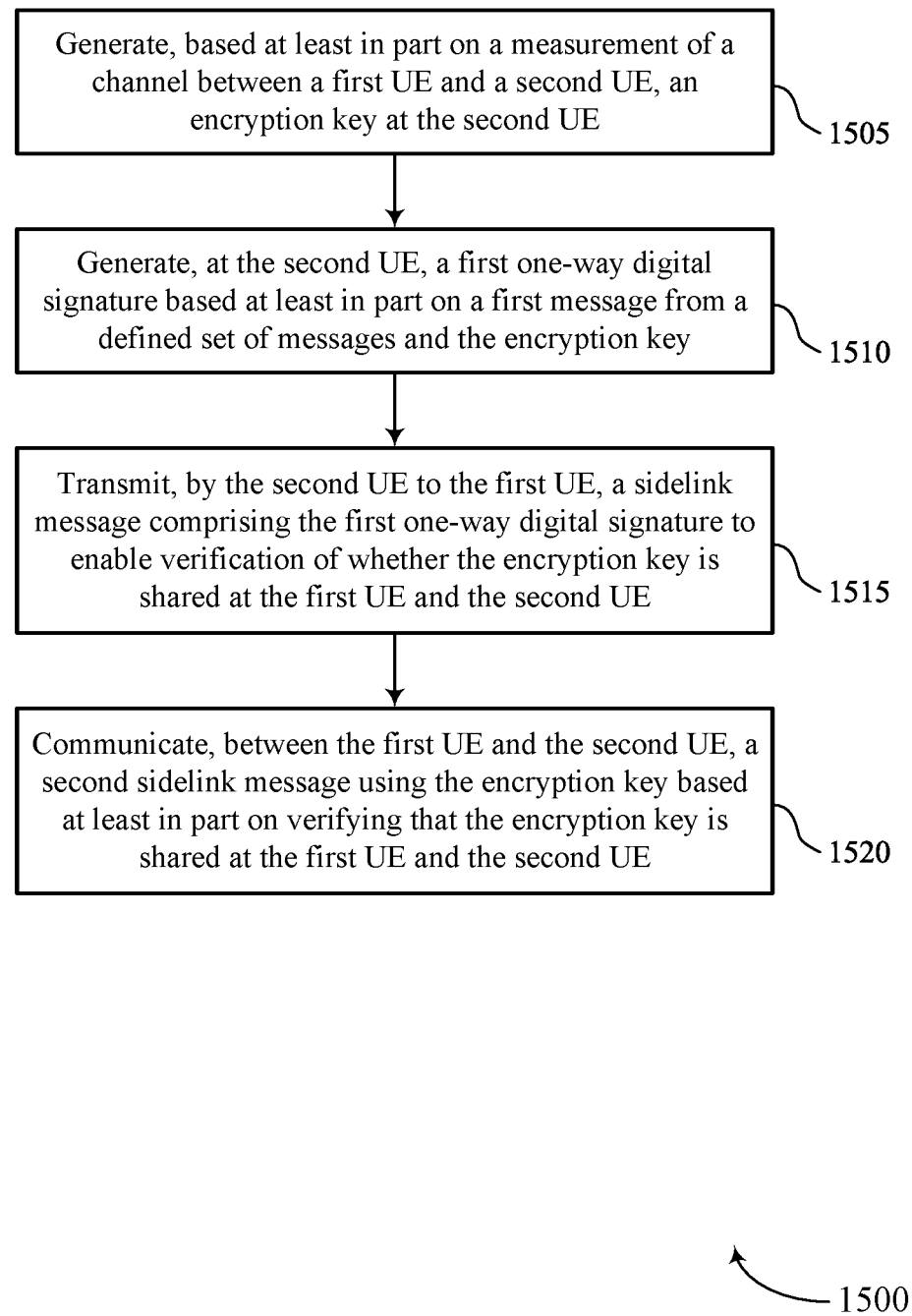

FIG. 15 shows a flowchart illustrating a method 1500 that supports encryption key generation and verification techniques in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include generating, based at least in part on a measurement of a channel between a first UE and a second UE, an encryption key at the second UE. The operations of 1505 may be performed in accordance with examples as disclosed herein. In some examples, aspects of the operations of 1505 may be performed by an encryption key component 925 as described with reference to FIG. 9.

At 1510, the method may include generating, at the second UE, a first one-way digital signature based at least in part on a first message from a defined set of messages and the encryption key. The operations of 1510 may be performed in accordance with examples as disclosed herein. In some examples, aspects of the operations of 1510 may be performed by a digital signature component 930 as described with reference to FIG. 9.

At 1515, the method may include transmitting, by the second UE to the first UE, a sidelink message comprising the first one-way digital signature to enable verification of whether the encryption key is shared at the first UE and the second UE. The operations of 1515 may be performed in accordance with examples as disclosed herein. In some examples, aspects of the operations of 1515 may be performed by a sidelink component 940 as described with reference to FIG. 9.

At 1520, the method may include communicating, between the first UE and the second UE, a second sidelink message using the encryption key based at least in part on verifying that the encryption key is shared at the first UE and the second UE. The operations of 1520 may be performed in accordance with examples as disclosed herein. In some examples, aspects of the operations of 1520 may be performed by a sidelink component 940 as described with reference to FIG. 9.

Figure 16:
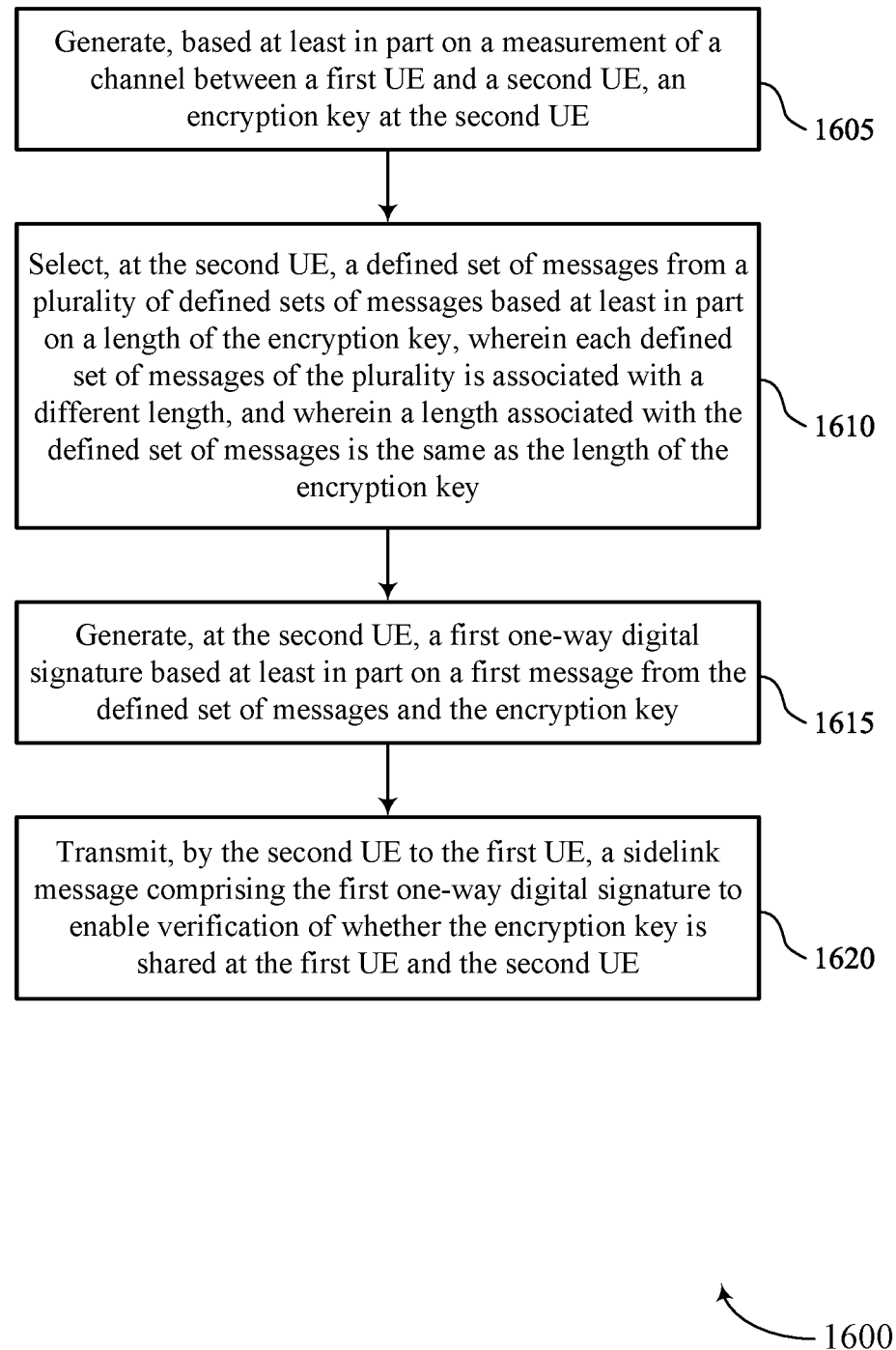

FIG. 16 shows a flowchart illustrating a method 1600 that supports encryption key generation and verification techniques in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include generating, based at least in part on a measurement of a channel between a first UE and a second UE, an encryption key at the second UE. The operations of 1605 may be performed in accordance with examples as disclosed herein. In some examples, aspects of the operations of 1605 may be performed by an encryption key component 925 as described with reference to FIG. 9.

At 1610, the method may include selecting, at the second UE, a defined set of messages from a plurality of defined sets of messages based at least in part on a length of the encryption key, wherein each defined set of messages of the plurality is associated with a different length, and wherein a length associated with the defined set of messages is the same as the length of the encryption key. The operations of 1610 may be performed in accordance with examples as disclosed herein. In some examples, aspects of the operations of 1610 may be performed by a digital signature component 930 as described with reference to FIG. 9.

At 1615, the method may include generating, at the second UE, a first one-way digital signature based at least in part on a first message from the defined set of messages and the encryption key. The operations of 1615 may be performed in accordance with examples as disclosed herein. In some examples, aspects of the operations of 1615 may be performed by a digital signature component 930 as described with reference to FIG. 9.

At 1620, the method may include transmitting, by the second UE to the first UE, a sidelink message comprising the first one-way digital signature to enable verification of whether the encryption key is shared at the first UE and the second UE. The operations of 1620 may be performed in accordance with examples as disclosed herein. In some examples, aspects of the operations of 1620 may be performed by a sidelink component 940 as described with reference to FIG. 9.

Figure 17:
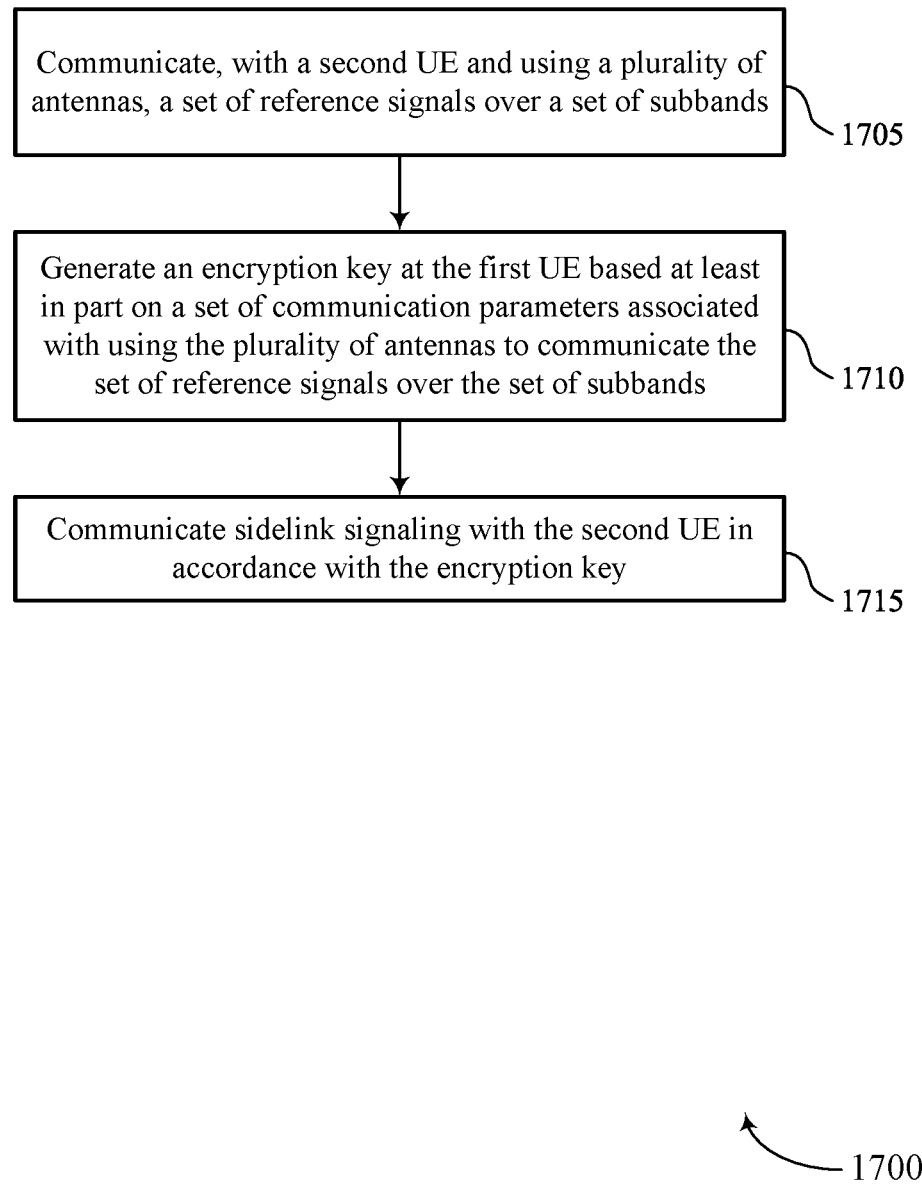

FIG. 17 shows a flowchart illustrating a method 1700 that supports encryption key generation and verification techniques in accordance with aspects of the present disclosure. The operations of the method 1700 may be implemented by a first UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include communicating, with a second UE and using a set of multiple antennas, a set of reference signals over a set of subbands. The operations of 1705 may be performed in accordance with examples as disclosed herein. In some examples, aspects of the operations of 1705 may be performed by a reference signal component 945 as described with reference to FIG. 9.

At 1710, the method may include generating an encryption key at the first UE based at least in part on a set of communication parameters associated with using the set of multiple antennas to communicate the set of reference signals over the set of subbands. The operations of 1710 may be performed in accordance with examples as disclosed herein. In some examples, aspects of the operations of 1710 may be performed by an encryption key component 925 as described with reference to FIG. 9.

At 1715, the method may include communicating sidelink signaling with the second UE in accordance with the encryption key. The operations of 1715 may be performed in accordance with examples as disclosed herein. In some examples, aspects of the operations of 1715 may be performed by a sidelink component 940 as described with reference to FIG. 9.

Figure 18:
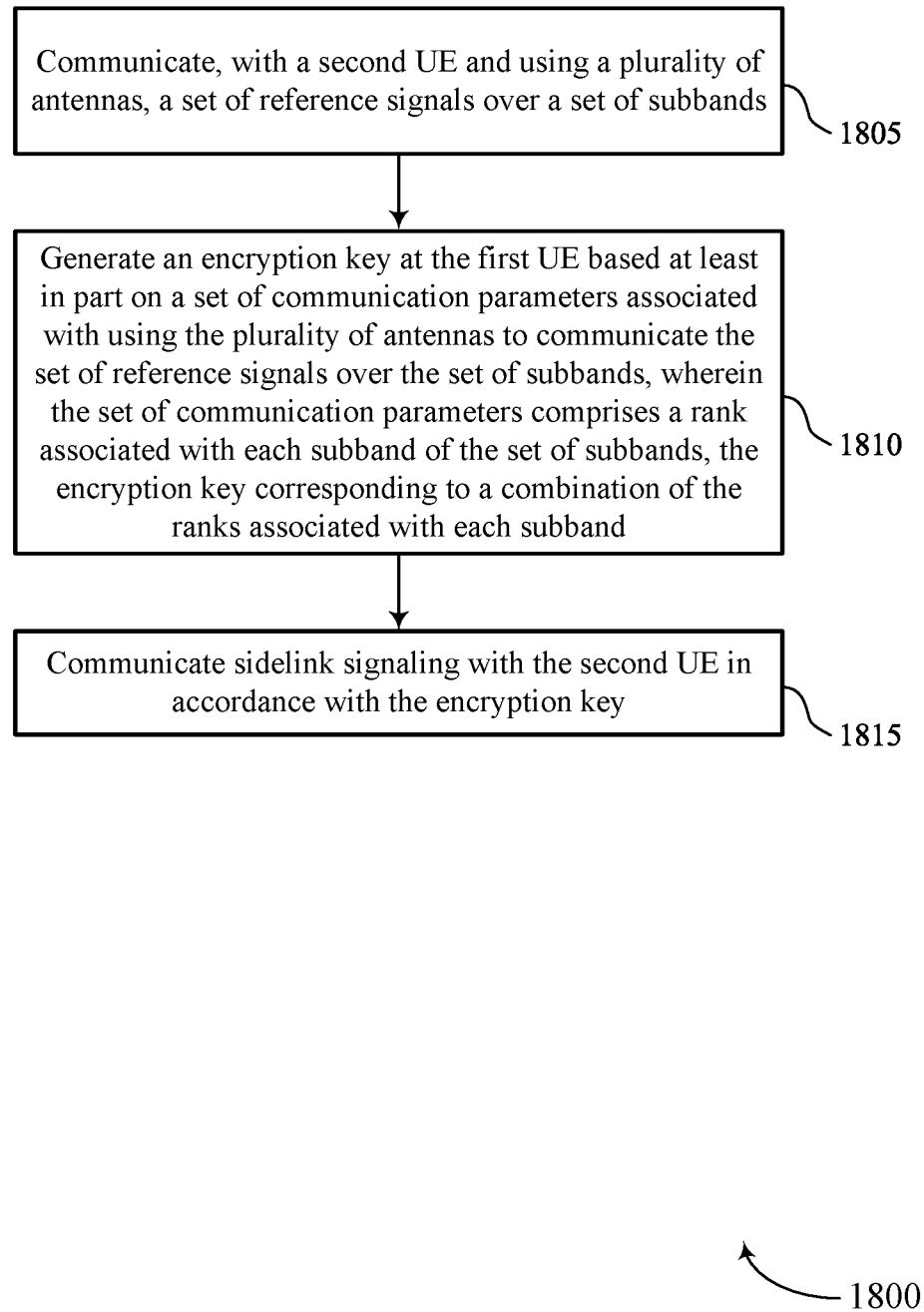

FIG. 18 shows a flowchart illustrating a method 1800 that supports encryption key generation and verification techniques in accordance with aspects of the present disclosure. The operations of the method 1800 may be implemented by a first UE or its components as described herein. For example, the operations of the method 1800 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1805, the method may include communicating, with a second UE and using a set of multiple antennas, a set of reference signals over a set of subbands. The operations of 1805 may be performed in accordance with examples as disclosed herein. In some examples, aspects of the operations of 1805 may be performed by a reference signal component 945 as described with reference to FIG. 9.

At 1810, the method may include generating an encryption key at the first UE based at least in part on a set of communication parameters associated with using the plurality of antennas to communicate the set of reference signals over the set of subbands, wherein the set of communication parameters comprises a rank associated with each subband of the set of subbands, the encryption key corresponding to a combination of the ranks associated with each subband. The operations of 1810 may be performed in accordance with examples as disclosed herein. In some examples, aspects of the operations of 1810 may be performed by an encryption key component 925 as described with reference to FIG. 9.

At 1815, the method may include communicating sidelink signaling with the second UE in accordance with the encryption key. The operations of 1815 may be performed in accordance with examples as disclosed herein. In some examples, aspects of the operations of 1815 may be performed by a sidelink component 940 as described with reference to FIG. 9.

The following provides an overview of aspects of the present disclosure:

Aspect 1: A method for wireless communication at a first UE, comprising: generating a first encryption key at the first UE based at least in part on a measurement of a channel between the first UE and a second UE; receiving, from the second UE, a sidelink message comprising a first one-way digital signature, wherein the first one-way digital signature is based at least in part on a first message from a defined set of messages and a second encryption key at the second UE; generating a set of one-way digital signatures at the first UE using the first encryption key, wherein each one-way digital signature of the set of one-way digital signatures corresponds to a separate message of the defined set of messages; and selecting between using the first encryption key to communicate with the second UE and generating a new encryption key to communicate with the second UE, wherein the selecting is based at least in part on a comparison between the first one-way digital signature received from the second UE and a second one-way digital signature in the set of one-way digital signatures generated at the first UE.

Aspect 2: The method of aspect 1, further comprising: communicating, with the second UE, a second sidelink message using the first encryption key based at least in part on the comparison indicating a match between the first one-way digital signature and the second one-way digital signature.

Aspect 3: The method of any of aspects 1 through 2, further comprising: selecting the defined set of messages for generating the set of one-way digital signatures from a plurality of defined sets of messages based at least in part on a length of the first encryption key, wherein each defined set of messages of the plurality is associated with a different length, and wherein a length associated with the defined set of messages is the same as the length of the first encryption key.

Aspect 4: The method of any of aspects 1 and 3, further comprising: generating the new encryption key based at least in part on the comparison and a second comparison between the first one-way digital signature and each remaining one-way digital signatures in the set of one-way digital signatures indicating a lack of a match between the first one-way digital signature and each of the one-way digital signatures in the set of one-way digital signatures.

Aspect 5: The method of aspect 4, wherein the new encryption key is generated based at least in part on a second measurement of a subset of subbands of the channel, each subband of the subset of subbands having a respective SINR that satisfies a threshold SINR.

Aspect 6: The method of aspect 5, further comprising: communicating, with the second UE, a second sidelink message that indicates the subset of subbands associated with generating the new encryption key, wherein the new encryption key is generated based at least in part on the second sidelink message.

Aspect 7: The method of any of aspects 1 through 6, wherein generating the first encryption key comprises: generating a first portion of the first encryption key based at least in part on a first channel measurement of a first subset of subbands of the channel, each subband of the first subset of subbands having a respective SINR that satisfies a first threshold SINR; generating, after generating the first portion of the first encryption key, a second portion of the first encryption key based at least in part on a second channel measurement of a second subset of subbands of the channel, each subband of the second subset of subbands having a respective SINR that fails to satisfy the first threshold SINR and satisfies a second threshold SINR; and combining the first portion of the first encryption key and the second portion of the first encryption key to form the first encryption key based at least in part on a third subset of subbands of the channel having SINRs that fail to satisfy a third threshold SINR.

Aspect 8: The method of aspect 7, wherein the first portion of the first encryption key and the second portion of the first encryption key are combined based at least in part on verifying that the first portion of the first encryption key is the same as a first portion of the second encryption key and verifying that the second portion of the first encryption key is the same as a second portion of the second encryption key.

Aspect 9: The method of any of aspects 1 through 8, wherein generating the first encryption key comprises: generating a first portion of the first encryption key based at least in part on a first measurement of a first subset of subbands of the channel, wherein the first portion of the first encryption key is verified as being the same as a first portion of the second encryption key; receiving, from the second UE, a second sidelink message comprising a second portion of the second encryption key that is encoded using the first portion of the first encryption key; and combining the first portion of the first encryption key and the second portion of the second encryption key to form the first encryption key.

Aspect 10: The method of any of aspects 1 through 9, wherein a first length of the new encryption key is shorter than a second length of the first encryption key.

Aspect 11: A method for wireless communication, comprising: generating, based at least in part on a measurement of a channel between a first UE and a second UE, an encryption key at the second UE; generating, at the second UE, a first one-way digital signature based at least in part on a first message from a defined set of messages and the encryption key; and transmitting, by the second UE to the first UE, a sidelink message comprising the first one-way digital signature to enable verification of whether the encryption key is shared at the first UE and the second UE.

Aspect 12: The method of aspect 11, further comprising: communicating, between the first UE and the second UE, a second sidelink message using the encryption key based at least in part on verifying that the encryption key is shared at the first UE and the second UE.

Aspect 13: The method of any of aspects 11 through 12, further comprising: selecting, at the second UE, the defined set of messages from a plurality of defined sets of messages based at least in part on a length of the encryption key, wherein each defined set of messages of the plurality is associated with a different length, and wherein a length associated with the defined set of messages is the same as the length of the encryption key.

Aspect 14: The method of aspect 13, wherein the first message is randomly selected from the defined set of messages.

Aspect 15: The method of any of aspects 11 and 13 through 14, further comprising: generating, at the second UE, a second encryption key based at least in part on failing to verify that the encryption key is shared at the first UE and the second UE; generating, at the second UE, a second one-way digital signature based at least in part on a second message from a second defined set of messages and the second encryption key; and transmitting, by the second UE to the first UE, a second sidelink message comprising the second one-way digital signature to enable verification of whether the second encryption key is shared at the first UE and the second UE.

Aspect 16: The method of aspect 15, wherein the second encryption key is generated based at least in part on a second measurement of a subset of subbands of the channel, each subband of the subset of subbands having a respective SINR that satisfies a threshold SINR.

Aspect 17: The method of aspect 16, further comprising: communicating, between the first UE and the second UE, a third sidelink message that indicates the subset of subbands associated with generating the second encryption key, wherein the second encryption key is generated based at least in part on the third sidelink message.

Aspect 18: The method of any of aspects 15 through 17, wherein a first length of encryption key is longer than a second length of the second encryption key.

Aspect 19: The method of any of aspects 11 through 18, wherein generating the encryption key at the second UE comprises: generating a first portion of the encryption key based at least in part on a first channel measurement of a first subset of subbands of the channel, each subband of the first subset of subbands having a respective SINR that satisfies a first threshold SINR; generating, after verifying that the first portion of the encryption key is shared at the first UE and the second UE, a second portion of the encryption key based at least in part on a second channel measurement of a second subset of subbands of the channel, each subband of the second subset of subbands having a respective SINR that fails to satisfy the first threshold SINR and satisfies a second threshold SINR; and combining, the first portion of the encryption key and the second portion of the encryption key to form the encryption key based at least in part on a third subset of subbands of the channel having SINRs that fail to satisfy a third threshold SINR.

Aspect 20: The method of any of aspects 11 through 19, wherein generating the encryption key at the second UE comprises: generating a first portion of the encryption key based at least in part on a first measurement of a first subset of subbands of the channel, wherein the first portion of the encryption key is verified as being shared at the first UE and the second UE; and generating a second portion of the encryption key, wherein the second portion of the encryption key fails to be verified as being shared at the first UE and the second UE, the method further comprising: transmitting, from the second UE to the first UE, a second sidelink message comprising the second portion of the encryption key that is encoded using the first portion of the encryption key based at least in part on the second portion of the encryption key failing to be verified, wherein the encryption key corresponds to a combination of the first portion of the encryption key and the second portion of the encryption key based at least in part on transmitting the second sidelink message.

Aspect 21: A method for wireless communication at a first UE, comprising: communicating, with a second UE and using a plurality of antennas, a set of reference signals over a set of subbands; generating an encryption key at the first UE based at least in part on a set of communication parameters associated with using the plurality of antennas to communicate the set of reference signals over the set of subbands; and communicating sidelink signaling with the second UE in accordance with the encryption key.

Aspect 22: The method of aspect 21, wherein the set of communication parameters comprises a rank associated with each subband of the set of subbands, the encryption key corresponding to a combination of the ranks associated with each subband.

Aspect 23: The method of aspect 21, wherein the set of communication parameters comprises an eigen value distribution associated with each subband of the set of subbands, the encryption key corresponding to a combination of eigen value distributions associated with each subband.

Aspect 24: The method of aspect 21, wherein the set of communication parameters comprises a conditional value associated with each subband of the set of subbands, each conditional value being a ratio of a maximum eigen value of a respective subband to a minimum eigen value of the respective subband, and the encryption key corresponds to a combination of the conditional values associated with each subband.

Aspect 25: The method of aspect 21, wherein the set of communication parameters comprises a PMI associated with each subband of the set of subbands, the encryption key corresponding to a combination of the PMIs associated with each subband.

Aspect 26: The method of any of aspects 21 through 25, further comprising: receiving, from a network entity, a message comprising a seed that indicates the plurality of antennas to use to communicate with the second UE and the set of subbands over which to communicate with the second UE.

Aspect 27: An apparatus for wireless communication at a first UE, comprising a processor; memory coupled with the processor; and instructions stored in the memory and executable by the processor to cause the apparatus to perform a method of any of aspects 1 through 10.

Aspect 28: An apparatus for wireless communication at a first UE, comprising at least one means for performing a method of any of aspects 1 through 10.

Aspect 29: A non-transitory computer-readable medium storing code for wireless communication at a first UE, the code comprising instructions executable by a processor to perform a method of any of aspects 1 through 10.

Aspect 30: An apparatus for wireless communication, comprising a processor; memory coupled with the processor; and instructions stored in the memory and executable by the processor to cause the apparatus to perform a method of any of aspects 11 through 20.

Aspect 31: An apparatus for wireless communication, comprising at least one means for performing a method of any of aspects 11 through 20.

Aspect 32: A non-transitory computer-readable medium storing code for wireless communication, the code comprising instructions executable by a processor to perform a method of any of aspects 11 through 20.

Aspect 33: An apparatus for wireless communication at a first UE, comprising a processor; memory coupled with the processor; and instructions stored in the memory and executable by the processor to cause the apparatus to perform a method of any of aspects 21 through 26.

Aspect 34: An apparatus for wireless communication at a first UE, comprising at least one means for performing a method of any of aspects 21 through 26.

Aspect 35: A non-transitory computer-readable medium storing code for wireless communication at a first UE, the code comprising instructions executable by a processor to perform a method of any of aspects 21 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first user equipment (UE), comprising:
    one or more processors;
    one or more memories coupled with the one or more processors; and
    instructions stored in the one or more memories and executable by the one or more processors to cause the apparatus to:
        generate a first encryption key at the first UE based at least in part on a measurement of a channel between the first UE and a second UE;
        receive, from the second UE, a sidelink message comprising a first one-way digital signature, wherein the first one-way digital signature is based at least in part on a first message from a defined set of messages and a second encryption key at the second UE;
        generate a plurality of one-way digital signatures at the first UE using the first encryption key, wherein each one-way digital signature of the plurality of one-way digital signatures corresponds to a separate message of the defined set of messages; and
        select between using the first encryption key to communicate with the second UE and generating a new encryption key to communicate with the second UE, wherein the selecting is based at least in part on a comparison between the first one-way digital signature received from the second UE and a second one-way digital signature in the plurality of one-way digital signatures generated at the first UE.

2. The apparatus of claim 1, wherein the instructions are further executable by the one or more processors to cause the apparatus to:
    communicate, with the second UE, a second sidelink message using the first encryption key based at least in part on the comparison indicating a match between the first one-way digital signature and the second one-way digital signature.

3. The apparatus of claim 1, wherein the instructions are further executable by the one or more processors to cause the apparatus to:
    select the defined set of messages for generating the plurality of one-way digital signatures from a plurality of defined sets of messages based at least in part on a length of the first encryption key, wherein each defined set of messages of the plurality of defined sets of messages is associated with a different length, and wherein a length associated with the defined set of messages is the same as the length of the first encryption key.

4. The apparatus of claim 1, wherein the instructions are further executable by the one or more processors to cause the apparatus to:
    generate the new encryption key based at least in part on the comparison and a second comparison between the first one-way digital signature and each remaining one-way digital signatures in the plurality of one-way digital signatures indicating a lack of a match between the first one-way digital signature and each of the one-way digital signatures in the plurality of one-way digital signatures.

5. The apparatus of claim 4, wherein the new encryption key is generated based at least in part on a second measurement of a subset of subbands of the channel, each subband of the subset of subbands having a respective signal-to-interference-plus-noise ratio that satisfies a threshold signal-to-interference-plus-noise ratio.

6. The apparatus of claim 5, wherein the instructions are further executable by the one or more processors to cause the apparatus to:
communicate, with the second UE, a second sidelink message that indicates the subset of subbands associated with generating the new encryption key, wherein the new encryption key is generated based at least in part on the second sidelink message.

7. The apparatus of claim 1, wherein the instructions to generate the first encryption key are executable by the one or more processors to cause the apparatus to:
generate a first portion of the first encryption key based at least in part on a first channel measurement of a first subset of subbands of the channel, each subband of the first subset of subbands having a respective signal-to-interference-plus-noise ratio that satisfies a first threshold signal-to-interference-plus-noise ratio;
generate, after generating the first portion of the first encryption key, a second portion of the first encryption key based at least in part on a second channel measurement of a second subset of subbands of the channel, each subband of the second subset of subbands having a respective signal-to-interference-plus-noise ratio that fails to satisfy the first threshold signal-to-interference-plus-noise ratio and satisfies a second threshold signal-to-interference-plus-noise ratio; and
combine the first portion of the first encryption key and the second portion of the first encryption key to form the first encryption key based at least in part on a third subset of subbands of the channel having signal-to-interference-plus-noise ratios that fail to satisfy a third threshold signal-to-interference-plus-noise ratio.

8. The apparatus of claim 7, wherein the first portion of the first encryption key and the second portion of the first encryption key are combined based at least in part on verifying that the first portion of the first encryption key is the same as a first portion of the second encryption key and verifying that the second portion of the first encryption key is the same as a second portion of the second encryption key.

9. The apparatus of claim 1, wherein the instructions to generate the first encryption key are executable by the one or more processors to cause the apparatus to:
generate a first portion of the first encryption key based at least in part on a first measurement of a first subset of subbands of the channel, wherein the first portion of the first encryption key is verified as being the same as a first portion of the second encryption key;
receive, from the second UE, a second sidelink message comprising a second portion of the second encryption key that is encoded using the first portion of the first encryption key; and
combine the first portion of the first encryption key and the second portion of the second encryption key to form the first encryption key.

10. The apparatus of claim 1, wherein a first length of the new encryption key is shorter than a second length of the first encryption key.

11. An apparatus for wireless communication, comprising:
one or more processors;
one or more memories coupled with the one or more processors; and
instructions stored in the one or more memories and executable by the one or more processors to cause the apparatus to:
generate, based at least in part on a measurement of a channel between a first user equipment (UE) and a second UE, an encryption key at the second UE;
generate, at the second UE, a first one-way digital signature based at least in part on an output of a one-way mapping function, a first message from a defined set of messages, and the encryption key, wherein the encryption key and the first message are inputs to the one-way mapping function; and
transmit, by the second UE to the first UE, a sidelink message comprising the first one-way digital signature to enable verification of whether the encryption key is shared at the first UE and the second UE.

12. The apparatus of claim 11, wherein the instructions are further executable by the one or more processors to cause the apparatus to:
communicate, between the first UE and the second UE, a second sidelink message using the encryption key based at least in part on verifying that the encryption key is shared at the first UE and the second UE.

13. The apparatus of claim 11, wherein the instructions are further executable by the one or more processors to cause the apparatus to:
select, at the second UE, the defined set of messages from a plurality of defined sets of messages based at least in part on a length of the encryption key, wherein each defined set of messages of the plurality is associated with a different length, and wherein a length associated with the defined set of messages is the same as the length of the encryption key.

14. The apparatus of claim 13, wherein the first message is randomly selected from the defined set of messages.

15. The apparatus of claim 11, wherein the instructions are further executable by the one or more processors to cause the apparatus to:
generate, at the second UE, a second encryption key based at least in part on failing to verify that the encryption key is shared at the first UE and the second UE;
generate, at the second UE, a second one-way digital signature based at least in part on a second message from a second defined set of messages and the second encryption key; and
transmit, by the second UE to the first UE, a second sidelink message comprising the second one-way digital signature to enable verification of whether the second encryption key is shared at the first UE and the second UE.

16. The apparatus of claim 15, wherein the second encryption key is generated based at least in part on a second measurement of a subset of subbands of the channel, each subband of the subset of subbands having a respective signal-to-interference-plus-noise ratio that satisfies a threshold signal-to-interference-plus-noise ratio.

17. The apparatus of claim 16, wherein the instructions are further executable by the one or more processors to cause the apparatus to:

communicate, between the first UE and the second UE, a third sidelink message that indicates the subset of subbands associated with generating the second encryption key, wherein the second encryption key is generated based at least in part on the third sidelink message.

18. The apparatus of claim 15, wherein a first length of encryption key is longer than a second length of the second encryption key.

19. The apparatus of claim 11, wherein the instructions to generate the encryption key at the second UE are executable by the one or more processors to cause the apparatus to:
generate a first portion of the encryption key based at least in part on a first channel measurement of a first subset of subbands of the channel, each subband of the first subset of subbands having a respective signal-to-interference-plus-noise ratio that satisfies a first threshold signal-to-interference-plus-noise ratio;
generate, after verifying that the first portion of the encryption key is shared at the first UE and the second UE, a second portion of the encryption key based at least in part on a second channel measurement of a second subset of subbands of the channel, each subband of the second subset of subbands having a respective signal-to-interference-plus-noise ratio that fails to satisfy the first threshold signal-to-interference-plus-noise ratio and satisfies a second threshold signal-to-interference-plus-noise ratio; and
combine, the first portion of the encryption key and the second portion of the encryption key to form the encryption key based at least in part on a third subset of subbands of the channel having signal-to-interference-plus-noise ratios that fail to satisfy a third threshold signal-to-interference-plus-noise ratio.

20. The apparatus of claim 11, wherein the instructions to generate the encryption key at the second UE are executable by the one or more processors to cause the apparatus to:
generate a first portion of the encryption key based at least in part on a first measurement of a first subset of subbands of the channel, wherein the first portion of the encryption key is verified as being shared at the first UE and the second UE; and
generate a second portion of the encryption key, wherein the second portion of the encryption key fails to be verified as being shared at the first UE and the second UE, the instructions further comprising:
transmit, from the second UE to the first UE, a second sidelink message comprising the second portion of the encryption key that is encoded using the first portion of the encryption key based at least in part on the second portion of the encryption key failing to be verified,
wherein the encryption key corresponds to a combination of the first portion of the encryption key and the second portion of the encryption key based at least in part on transmitting the second sidelink message.

21. An apparatus for wireless communication at a first user equipment (UE), comprising:
one or more processors;
one or more memories coupled with the one or more processors; and
instructions stored in the one or more memories and executable by the one or more processors to cause the apparatus to:
communicate, with a second UE and using a plurality of antennas, a set of reference signals over a set of subbands;
generate an encryption key at the first UE based at least in part on a set of communication parameters associated with using the plurality of antennas to communicate the set of reference signals over the set of subbands;
verify the encryption key is shared at the first UE and the second UE based at least in part on a one-way mapping function; and
communicate sidelink signaling with the second UE in accordance with the encryption key.

22. The apparatus of claim 21, wherein the set of communication parameters comprises a rank associated with each subband of the set of subbands, the encryption key corresponding to a combination of the ranks associated with each subband.

23. The apparatus of claim 21, wherein the set of communication parameters comprises an eigen value distribution associated with each subband of the set of subbands, the encryption key corresponding to a combination of eigen value distributions associated with each subband.

24. The apparatus of claim 21, wherein:
the set of communication parameters comprises a conditional value associated with each subband of the set of subbands, each conditional value being a ratio of a maximum eigen value of a respective subband to a minimum eigen value of the respective subband, and
the encryption key corresponds to a combination of the conditional values associated with each subband.

25. The apparatus of claim 21, wherein the set of communication parameters comprises a precoding matrix indicator associated with each subband of the set of subbands, the encryption key corresponding to a combination of the precoding matrix indicators associated with each subband.

26. The apparatus of claim 21, wherein the instructions are further executable by the one or more processors to cause the apparatus to:
receive, from a network entity, a message comprising a seed that indicates the plurality of antennas to use to communicate with the second UE and the set of subbands over which to communicate with the second UE.

27. A method for wireless communication at a first user equipment (UE), comprising:
generating a first encryption key at the first UE based at least in part on a measurement of a channel between the first UE and a second UE;
receiving, from the second UE, a sidelink message comprising a first one-way digital signature, wherein the first one-way digital signature is based at least in part on a first message from a defined set of messages and a second encryption key at the second UE;
generating a plurality of one-way digital signatures at the first UE using the first encryption key, wherein each one-way digital signature of the plurality of one-way digital signatures corresponds to a separate message of the defined set of messages; and
selecting between using the first encryption key to communicate with the second UE and generating a new encryption key to communicate with the second UE, wherein the selecting is based at least in part on a comparison between the first one-way digital signature received from the second UE and a second one-way digital signature in the plurality of one-way digital signatures generated at the first UE.

28. The method of claim 27, further comprising:
communicating, with the second UE, a second sidelink message using the first encryption key based at least in part on the comparison indicating a match between the first one-way digital signature and the second one-way digital signature.

29. The method of claim 27, further comprising:

selecting the defined set of messages for generating the plurality of one-way digital signatures from a plurality of defined sets of messages based at least in part on a length of the first encryption key, wherein each defined set of messages of the plurality is associated with a different length, and wherein a length associated with the defined set of messages is the same as the length of the first encryption key.

30. The method of claim 27, further comprising:

generating the new encryption key based at least in part on the comparison and a second comparison between the first one-way digital signature and each remaining one-way digital signatures in the plurality of one-way digital signatures indicating a lack of a match between the first one-way digital signature and each of the one-way digital signatures in the plurality of one-way digital signatures.

\* \* \* \* \*